United States Patent [19]

Kley

[11] Patent Number: 4,935,728
[45] Date of Patent: * Jun. 19, 1990

[54] COMPUTER CONTROL
[75] Inventor: Victor B. Kley, Berkeley, Calif.
[73] Assignee: Altra Corporation, Laramie, Wyo.
[*] Notice: The portion of the term of this patent subsequent to Nov. 1, 2005 has been disclaimed.
[21] Appl. No.: 122,951
[22] Filed: Nov. 20, 1987

Related U.S. Application Data

[63] Continuation-in-part of Ser. No. 688,444, Jan. 2, 1985, Pat. No. 4,782,327.
[51] Int. Cl.$^5$ ............................................. G06F 3/033
[52] U.S. Cl. .................................. 340/709; 340/710; 341/31; 341/35
[58] Field of Search .................. 340/709, 710; 341/31, 341/35

[56] References Cited

U.S. PATENT DOCUMENTS

| | | |
|---|---|---|
| 3,218,911 | 11/1965 | Bower et al. . |
| 3,770,970 | 11/1973 | Trump . |
| 3,781,110 | 12/1973 | Leitz et al. . |
| 3,784,833 | 1/1974 | Kimura . |
| 3,821,795 | 6/1974 | Okano . |
| 3,886,361 | 5/1975 | Wester . |
| 3,936,632 | 2/1976 | Bradley et al. . |
| 4,028,695 | 6/1977 | Saich . |
| 4,041,258 | 8/1977 | Harada . |
| 4,092,532 | 5/1978 | Hayes . |
| 4,382,166 | 5/1983 | Kim . |
| 4,409,479 | 10/1983 | Sprague et al. . |
| 4,414,438 | 11/1983 | Maier et al. . |
| 4,442,351 | 4/1984 | Pfeifer et al. . |
| 4,464,652 | 8/1984 | Lapson et al. . |
| 4,533,827 | 8/1985 | Fincher . |
| 4,536,650 | 8/1985 | Carena et al. . |
| 4,584,510 | 4/1986 | Hollow . |
| 4,670,743 | 6/1987 | Zenke ..................................... 341/31 |
| 4,698,626 | 10/1987 | Sato et al. ........................... 340/710 |
| 4,782,327 | 11/1988 | Kley et al. ........................... 340/709 |

FOREIGN PATENT DOCUMENTS 1163428 2/1964 Fed. Rep. of Germany .

OTHER PUBLICATIONS

"Coded Sphere Joystick", M. W. Carmichael, IBM Corporation, 1976.
"Pointing Device Communications", V. Kley, *Computer Graphics World*, 11/83.
"The Best of Both Worlds", M. Higgins, *Computer Graphics World*, Feb., 1984.
"'Puck pointer' combines functions of mouse and joystick in number-pad-sized package", *Electronics Week*, Jul. 23, 1984.
"High-Tech Input Devices", *PC Magazine*, vol. 6, No. 14, Aug., 1987.
"Lightgate Input Device Offers More Intuitive, Precise Interface", M. Brownstein, *Info World*, Dec. 14, 1987.

*Primary Examiner*—Donald J. Yusko
*Assistant Examiner*—Michael Horabik
*Attorney, Agent, or Firm*—Flehr, Hohbach, Test, Albritton & Herbert

[57] ABSTRACT

A computer pointing system employs two modes of moving a marker on a computer display in correspondence with movement of a finger-grippable element within a pointer area of movement wherein one of the modes of movement produces a movement of the marker proportional to movement of the finger-grippable element and the second mode produces movement of the marker which is equal to the product of a distance of the marker from an edge of a display area of movement times the quotient of the distance of movement of the finger-grippable element divided by the distance of the finger-grippable element to an edge of the pointer area of movement. The second mode can be called by movement of the finger-grippable element at a rate greater than a predetermined rate or at a position within an outer ring area of the pointer area of movement. Edge regions of the pointer area of movement define macro instruction regions which, when called by an operation of a switch, pass macro instructions to a user program. An index of pages of a file having a plurality of pages can be displayed by selecting an edge region and can be used to select the page to be presented on the display of the user program. Gratings employed in the pointing device are formed by undulations in transparent walls wherein both valleys and hill tops of the undulations define sections of the grating parallel to the movement which are equal to each other and to the component of inclined sidewalls in the direction of movement.

27 Claims, 27 Drawing Sheets

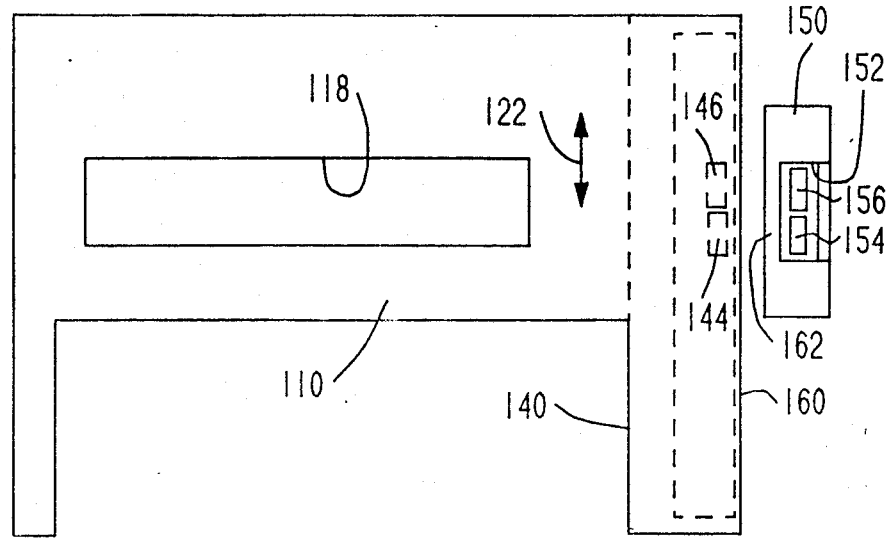
FIG. 6
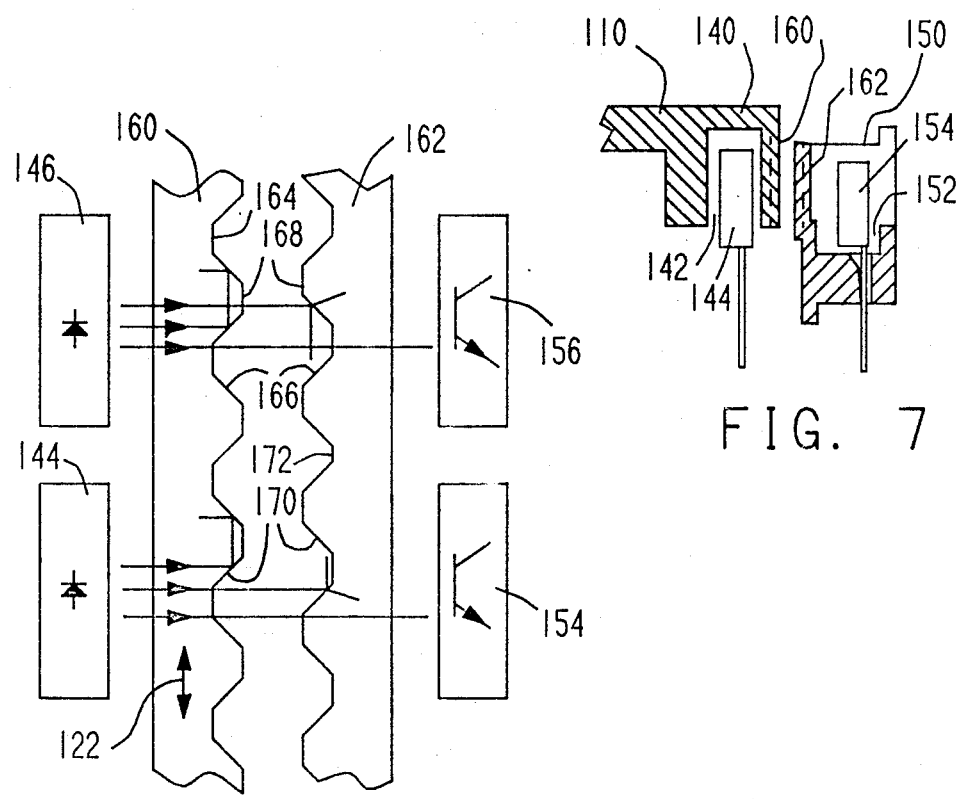
FIG. 7
FIG. 8

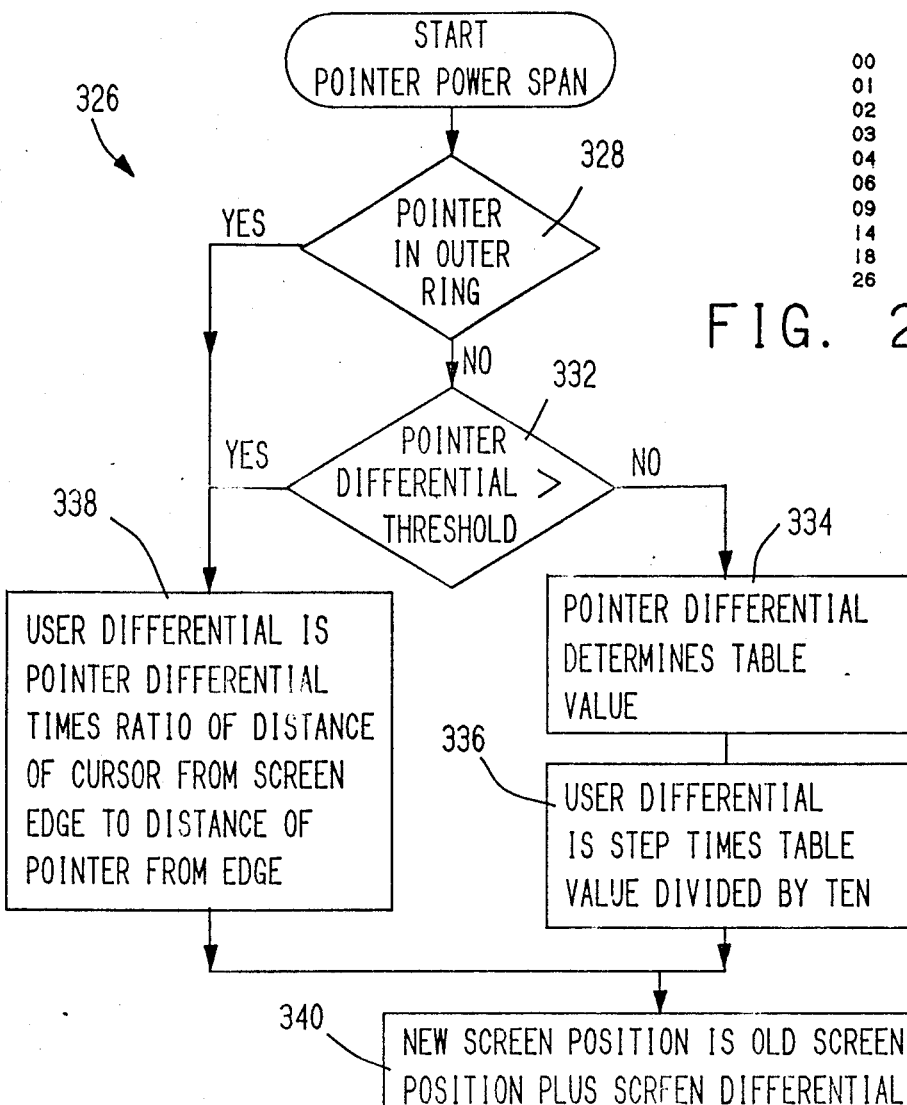
FIG. 20
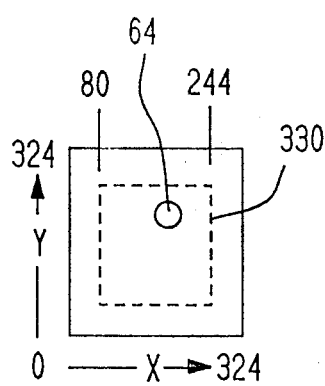
FIG. 18
FIG. 19

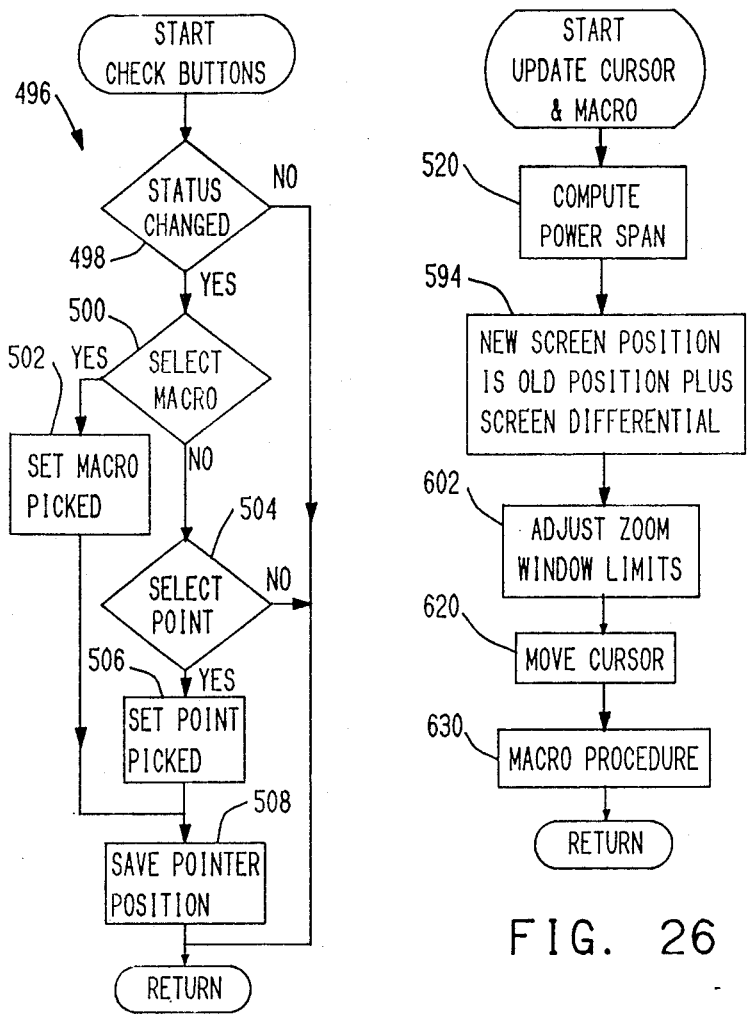
FIG. 25
FIG. 26
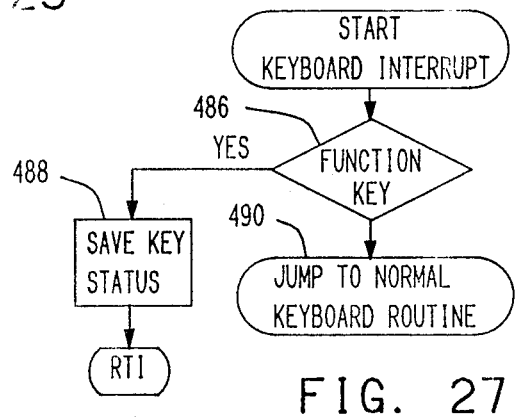
FIG. 27

```
            706
   AI    A5 /  A9    AI3
   EI   INCOME  E9   EI3
   II    I5   TAX    II3
   MI    M5    M9    MI3
```

COMPUTER CONTROL

CROSS-REFERENCE TO RELATED APPLICATION

This application is a continuation-in-part of U.S. application Ser. No. 688,444, filed Jan. 2, 1985, and now U.S. Pat. No. 4,782,327, and which is incorporated in its entirety by reference herein.

MICROFICHE APPENDIX

Attached hereto are five microfiche containing 450 frames of programs and an operating manual which can be employed in the described embodiments and in other embodiments. These microfiche are hereby incorporated by reference.

TECHNICAL FIELD

The present invention relates to computer control devices, and particularly, to data entry devices which are used for one or more functions such as two dimensional control of a cursor or marker on a computer display, and selection of program control signals like macros, textual display selection, etc.

DESCRIPTION OF THE PRIOR ART

The prior art contains many devices, such as cursor positioning keys, function keys, mice, track balls, joysticks, touch screens, light pens, tablets, and other devices, for controlling cursor movement and selecting functions on menus which can be popped up in computer programs. Cursor movement control by prior art devices suffer from one or more deficiencies such as being slow, requiring extensive arm movement, requiring a person to withdraw attention from the monitor, and other deficiencies. Additionally some programs, such as spreadsheet or word processing programs, use data files containing many pages of data, and it is sometimes time-consuming to scroll through the pages of a multipage file to find a desired page.

SUMMARY OF THE INVENTION

The invention is summarized by one or more features such as having fine and coarse cursor positioning modes wherein the coarse mode is proportional to a distance of the cursor to an edge of movement such as being equal to a product of the distance from the edge of movement times a quotient of a detected distance of movement of a pointing element divided by a distance of the pointing element from an edge of a pointer area of movement; having coarse and fine modes of cursor positioning selected by a pointer device rate of movement above and below, respectively, a predetermined rate; having coarse and fine modes of cursor positioning selected by pointing device positioning in an outer ring of movement or in a center area within the outer ring of movement, respectively; generating macro instructions for a user program by selecting an edge region of an area of movement of a pointing device, such as corner regions and areas adjacent each corner region of a rectangular area of pointer movement; generating a pop-up display of a listing of pages of a multipage file wherein a listing may be selected to display a desired page of the file; having gratings formed by undulations in transparent walls wherein both valley and hilltop surfaces along with opposite sloping side surfaces of the undulations extend equal distances in the direction of wall movement; and other features which are apparent from the following description, accompanying drawings, and expressly incorporated materials.

BRIEF DESCRIPTION OF THE DRAWINGS

FIG. 6 is a plan view of a plate sliding member with quadrature grating facilities for detecting movement in one of the two dimensions of movement of the pointing device of FIG. 2.

FIG. 7 is a cross-sectional view taken from the front of a portion of the quadrature grating detection facilities of FIG. 6.

FIG. 8 is a horizontal cross-sectional diagram showing the construction of gratings employed in a stationary member and a movable plate member of FIGS. 6 and 7.

FIG. 18 is a step diagram of a power span procedure employed in the mode select operate procedure of FIG. 15.

FIG. 19 is a diagram illustrating operation of the pointing device during operation of the power span procedure of FIG. 18.

FIG. 20 is a table of step values employed by one step in the procedure of FIG. 18.

FIG. 25 is a step diagram of a check buttons procedure employed in the procedure of FIG. 23.

FIG. 26 is a step diagram of an update cursor and macro procedure employed in the pointer interrupt procedure of FIG. 23.

FIG. 27 is a step diagram of a keyboard interrupt program for incorporating operation of keyboard keys in the pointer operation.

DESCRIPTION OF THE PREFERRED EMBODIMENTS

Figure 1:
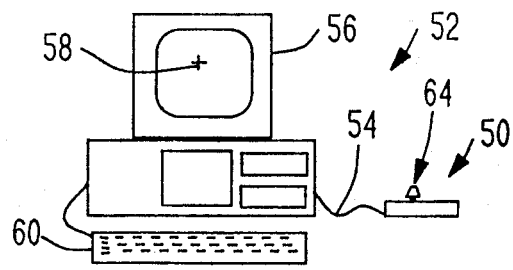
FIG. 1 is a front elevational view of a computer system in accordance with the invention.

As shown in FIG. 1, one embodiment of the invention includes a pointing device indicated generally at 50 connected by a multi-conductor cable 54 to a computer indicated generally at 52 which includes a monitor or display 56 wherein a cursor or marker 58 is generated and positioned on the display by an operator controlling the pointing device 50. The computer 52 is a conventional personal computer or the equivalent and has a keyboard 60 by which data and instructions may be entered. The pointing device 50 is designed for use with conventional software or programs with the requirement that such programs may require the addition of a driver program to receive and utilize information generated by the pointing device 50.

Figure 2:
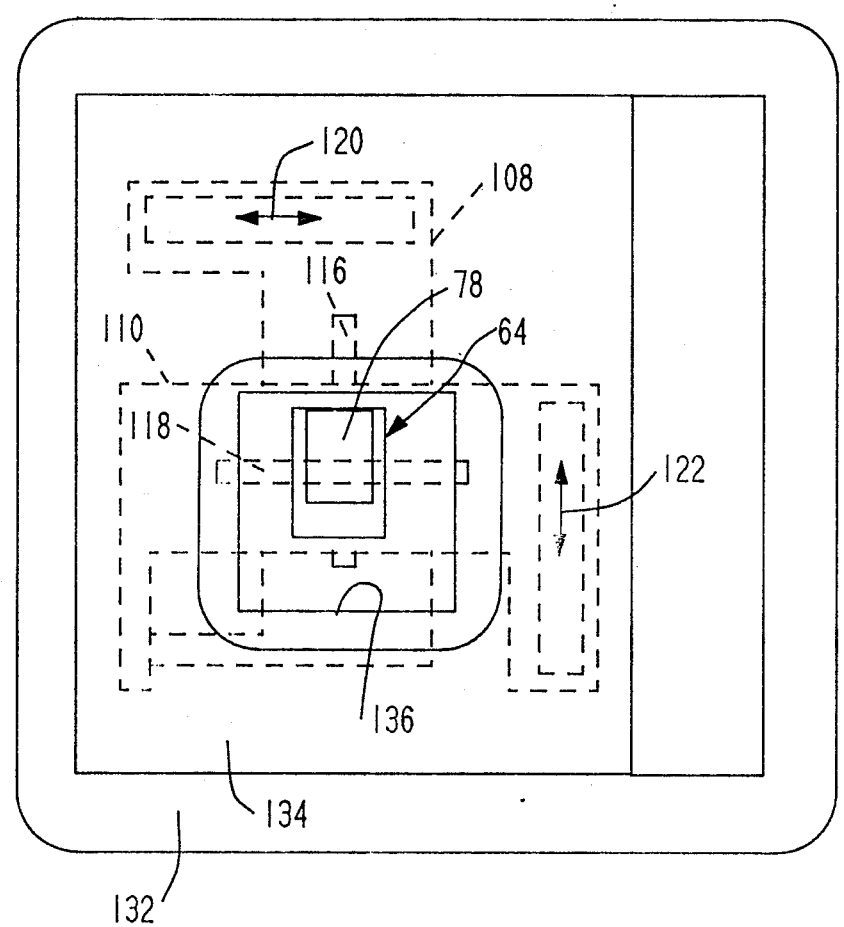
FIG. 2 is a plan view of a pointing device used in the computer system of FIG. 1.
Figures 3, 4, 5:
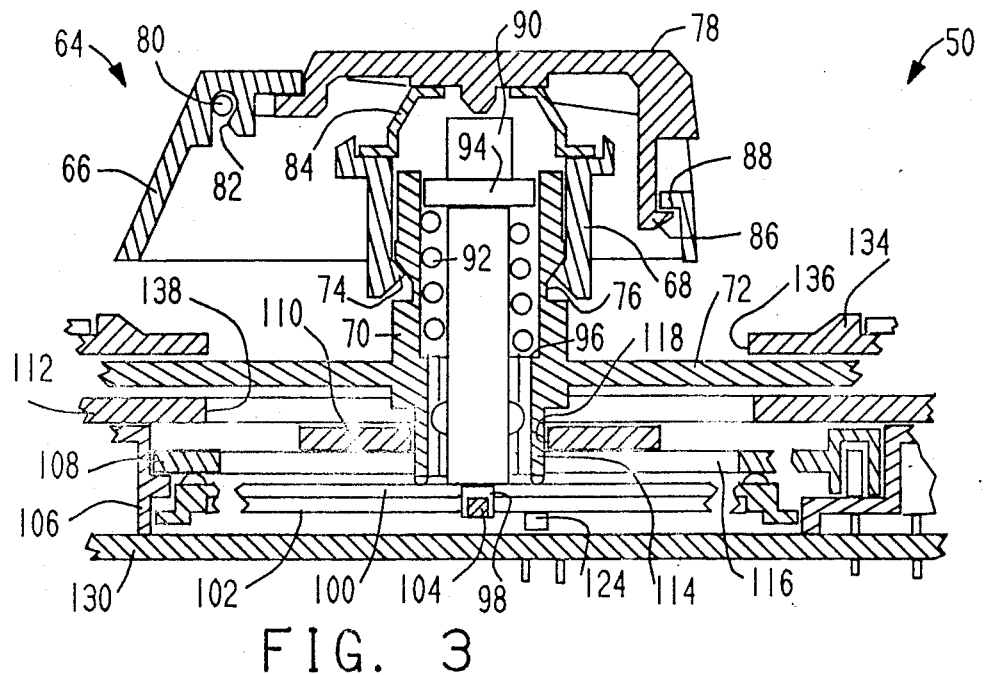
FIG. 3 is a cross-sectional view taken from the right side of a broken-away portion of the pointing device of FIG. 2.
FIG. 4 is an elevational view taken from the right side of a handle member of the pointing device of FIGS. 2 and 3.
FIG. 5 is a cross-sectional view taken from the front of the upper handle portion of the pointing device of FIGS. 2-4.

The device 50, as shown in FIGS. 1-3 includes a finger-grippable element indicated generally at 64, which may be gripped between the thumb and third finger, and moved within a rectangular or square horizontal area of movement, such as a 1.25 inch (3.2 cm) square horizontal area. The finger-grippable element 64 includes a molded handle member 66, see also FIGS. 4 and 5, which has a plurality of downward extending fingers 68 surrounding a tubular stem 70 extending upward from a slidable cover plate 72. Two of the fingers 68 include inward projections 74 which are resiliently interlocked with recesses 76 on the tubular stem 70 for retaining the handle member 66 on the stem 70. A switch button 78 has a pivot member 80 retained within snap recess 82 in a forward end of the handle member 66. A resilient tactile cone-shaped member 84 is interposed between the upper side of the center finger support of the handle portion 66 and the bottom side of the button 78 for urging the button 78 upward. The rear end of the button 78 has a projection 86 for engaging the underside of an inward-extending lip 88 of the handle portion 66 for limiting upward movement of the button 78 while permitting downward pivoting movement.

A pin member 90 is slidably mounted within the passageway of the stem 70 and is biased upward against the button 78 by a compression spring 92 which is interposed between a collar 94 on the pin 90 and an inner ledge 96 within the passageway of the tubular stem 70. A lower end portion 98 of the pin 90 has a reduced cross-section and extends through a slot 100 in a guillotine member 102 with inward extending lips 100 defining the slot being secured between the bottom end of the enlarged upper portion of the pin 90 and a pair of projections 104 extending beneath the lips 100. The guillotine member 102 is contained within a housing 106 along with a pair of sliding plate members 108 and 110 with a cover 112 secured on top of the housing. A downward projecting tubular portion 114 of the slide plate 72 has its outer periphery with a square configuration and extending through respective slots 116 and 118 in the lower and upper plate members 108 and 110. The lower plate member 108 is retained by walls of the housing 106 for sliding motion in one orthogonal direction 120, see FIG. 2, while the other plate member 110 is retained within the housing 106 for sliding motion in the direction 122. When the finger-grippable element 64 is moved in the direction 122, the lower portion 114 of the member 72 slides freely within the slot 116, and when the finger-grippable element 64 is moved in the direction 120, the lower portion 114 slides within the slot 118. The guillotine member 100 is slidable within the housing in the direction 120, while the lower portion 98 of the pin 90 slides within the slot 100 during movement of the finger-grippable element 64 in the direction 122. However, the guillotine member 102 is movable in an up and down direction, as viewed in FIG. 3, so that when the button 78 is pressed the pin 90 is pressed against the bias of the spring 92 and the guillotine member 102 is lowered to interrupt a light path of light impinging upon a light sensor or phototransistor 124 from a light emitting diode 126, see FIG. 9.

The parts 66, 72, 78, 84, 106, 108, 110 and 112 are formed from suitable molded polymers. Members which slide and/or which have members which slide thereon are formed from polymer materials which have powdered graphite or low friction polymers blended therein. For example, the parts can be formed from a polycarbonate which includes 20% by weight powdered polytetrafluoroethylene blended therein. The low friction material substantially reduces static or starting friction when the finger-grippable element is moved to thus avoid jumping of the cursor.

A more detailed description of the structure and operation of the housing 106, slide plates 108 and 110, guillotine 100, cover 112, and slide member 72 are contained in copending application Ser. No. 688,444, filed Jan. 2, 1985, which is incorporated in its entirety herein by reference. The housing 106, as well as the leads of the electrical components contained within the housing 106 are suitable mounted on a printed circuit board 130 which is in turn mounted in an enclosure 132, FIG. 2. The top wall 134 of the enclosure 132 contains a square opening 136 through which the stem 70 projects. The horizontal planar area of movement of the stem 70 is determined by the opening 136 and/or an opening 138 formed in the top 112 of the housing 106.

Each of the sliding plate members 108 and 110, as shown for the plate member 110 in FIGS. 6, 7 and 8, has an elongated head portion 140 which contains an elongated groove 142 extending parallel to the direction 122 and into which extend a pair of photodiodes 144 and 146. A stationary member 150, also mounted in the pointer housing as disclosed in the above mentioned application, has a recess 152 with a pair of light sensors or phototransistors 154 and 156 mounted therein in alignment with the respective LEDs 144 and 146. The head portion 140 has an outer wall 160 extending parallel to the direction 122, while the stationary member 150 contains a wall 162 extending parallel and adjacent the wall 160. In the above-mentioned prior application the walls 160 and 162 contained vertical slots to define gratings for modulating light from the LEDs 144 and 146 to generate quadrature related signals from the phototransistors 154 and 156. However, gratings in the walls 160 and 162 in the present embodiment are formed by molded undulations in the outer surfaces of the walls which are formed from a transparent plastic material, such as polycarbonate. As shown in FIG. 8, these undulations include valleys 164, first sloping side surfaces 166, hill top surfaces 168 and second sloping side surfaces 170, with the surfaces 164, 166, 168 and 170 being elongated or running vertically. The dimensions of the surfaces 164, 166, 168 and 170 extending in the direction 122 are all equal, except for one valley surface 172 formed in the wall 162 of the stationary member 150 between the photosensors 154 and 156; this wall portion 172 has a dimension in the direction 122 which is one-half of the dimension of the surfaces 164, 166, 168 and 170 in the direction 122 to thus form two gratings, which are phase-shifted 90° relative to each other, on the member 162.

Figures 13, 14:
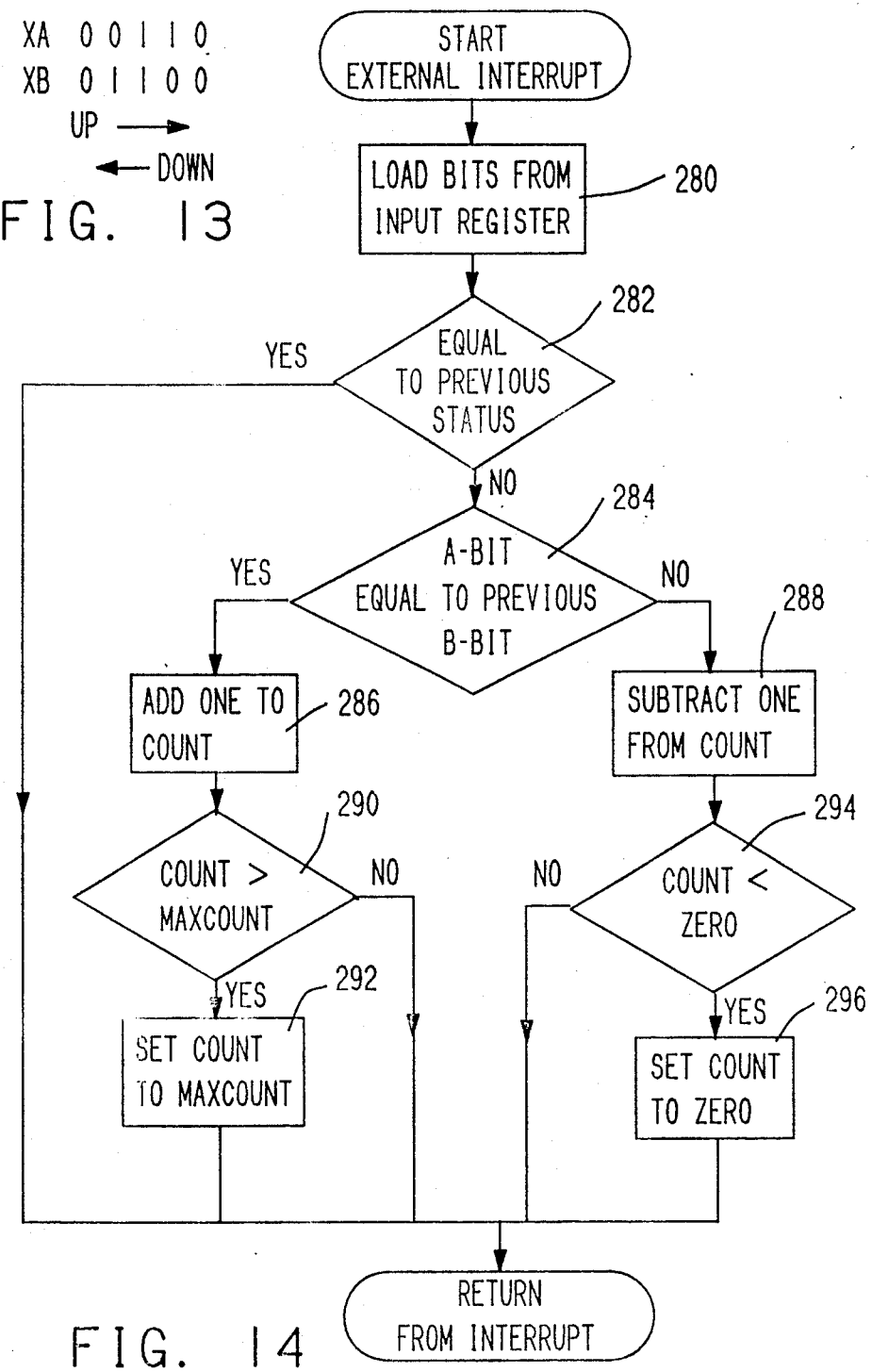
FIG. 13 is a table illustrating quadrature-generated signals in one dimension generated by sensing circuitry in the pointing device of FIG. 9.
FIG. 14 is a diagram of an interrupt procedure employed in the pointing device computer of FIG. 9 for maintaining a count indicating position of the pointing device in one dimension.

Light passing through the wall 160 from the LEDs 144 and 146 is internally reflected when it strikes one of the sloping surfaces 166 or 170, but passes through the valley and hilltop surfaces 164 and 168 which are parallel to the direction 122 and perpendicular to the direction of light emitted by the LEDs 144 and 146. Light which passes through the wall 160 and is emitted from the surfaces 164 and 168 is partially reflected and partially refracted if it strikes one of the sloping surfaces 166 or 170 of the wall 162, but passes through the wall 162 to the corresponding phototransistor 154 and 156 if the light impinges upon one of the valley surface 164 or hill top surface 168 of the stationary member wall 162. Due to the light reflection and refraction, movement of the wall 160 in the direction 122 causes the light impinging upon the light sensors 154 and 156 to be modulated. Since the surfaces 164, 166, 168 and 170 of the member 162 in line with the light sensor 154 from the LED 144 are 90° out of phase relative to the corresponding surfaces of the wall 162 in front of the phototransistor 156, the signals generated by the sensors 154 and 156 by movement of the slide member 110 will be 90° out of phase with each other. One complete cycle is defined by a valley surface 164 and a first sloping side surface 166 passing a point while a second complete cycle will occur when the succeeding hill top and second sloping surface pass the point. Binary signals generated for 1¼ cycles are illustrated in FIG. 13.

Figure 9:
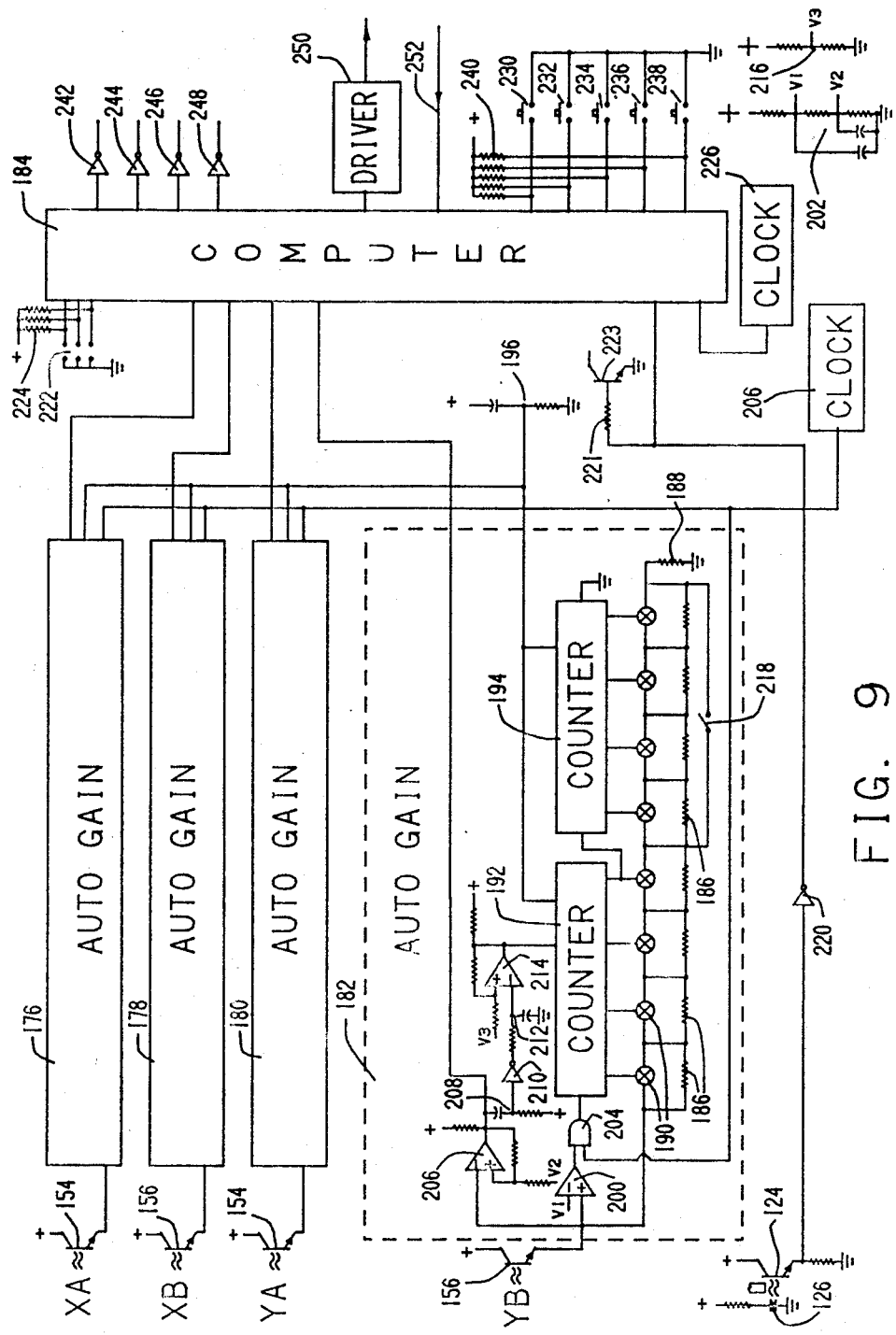
FIG. 9 is an electrical schematic of a circuit employed in the pointing device of FIGS. 2 and 3 for sending signals to a computer in the system of FIG. 1 to indicate position or movement of a finger-grippable element in the pointing device.

The circuitry employed in the pointing device 50 is illustrated in FIG. 9 wherein the outputs of phototransistors 154 and 156 generating the respective phases A and B of the quadrature signals indicating movement in the corresponding X and Y directions of the respective sliding plates 108 and 110 are connected by respective auto gain circuits 176, 178, 180 and 182 to corresponding inputs of a computer 184 such as type MC68HC805C4 integrated computer. Each of the auto gain circuits, as shown for the circuit 182, include a plurality of resistances 186 connected in series with the output of the phototransistor 156 and a resistance 188 to ground. A plurality of normally open electronic switches 190 have terminals connected across the respective resistances 186 and have control inputs connected to corresponding outputs of cascaded counters 192 and 194. The values of the resistances 186 are selected relative to each other to correspond directly to the numerical value of the corresponding counter output, i.e., the second resistance will have a value twice the first resistance, the third resistance will have a value twice the second resistance, etc. Reset inputs of the counters 192 and 194 are connected to a power up detecting circuit 196 which initially resets the counters 192 and 194 so that all of the resistances 186 are initially connected in series with the phototransistor 156 to produce a high gain. This output is connected to the non-inverting input of a first comparator 200 which has its second input connected to output V1 of a voltage divider 202 determining a desired maximum peak output. The output of the comparator 200 enables an AND gate 204 which has a high frequency clock 206 connected to its second input. The output of the AND gate 204 drives the clock input of the first counter 192. Thus, after power up and during initial movement of the point device, the peaks of the voltages detected by the phototransistor 156 will exceed the voltage V1 to enable the AND gate 204 to pass the clock pulses 206 to counter 192 to operate corresponding switches 190 shunting resistances 186 to reduce the resistance in series with the phototransistor 156 until the gain is reduced to that value corresponding to the maximum desired peak voltage.

The auto gain circuit 182 also contains a comparator 206 which has its inverting input connected to the output of phototransistor 156 and has its non-inverting output connected to a voltage tap V2 of the voltage divider 202. The voltage V2 is selected to be the normal mid-point of the peak to peak voltages generated by the phototransistor 156 so that the output of the comparator 206 is a square wave representing the binary quadrature signals applied to the computer inputs. The output of the comparator 206 is also connected through a differentiating circuit 208, an inverter 210 and an integrator circuit 212 to an inverting input of a comparator 214 which has its non-inverting input connected to a terminal V3 of a voltage divider 216. The output of the comparator 214 is connected to the enable input of the counter 192. The differentiator 208 is selected to produce a pulse output which has a duration less than that required to completely adjust the gain of a circuit so as to require a plurality of pulses from the phototransistor 156 in order to bring about proper adjustment of the resistances. This insures that an abnormally high voltage generated by the phototransistor 156 during an initialization state does not result in reducing the gain to a value below that which produces appropriate lengths of quadrature pulses. The integrator circuit 212 eliminates advancing the count of the counter 192 due to induced voltage spikes.

The auto gain circuit 182 contains two four-bit binary counters which control the resistance produced by eight of the resistances 186. With this large number of resistances, the value of the first resistance 186 can be relatively small to thus produce a relatively fine adjustment to the gain of the phototransistor 156. However, a single counter 192 can be employed with resistance values for the resistances 186 selected to produce a coarser adjustment. Additionally, a normally open switch 218 may be connected across the resistances of the counter 194 so that if it is determined during manufacture that the counter 194 is unnecessary, its resistances may be shunted by closing the switch 218 to produce a faster adjustment of the gain.

Figure 10:
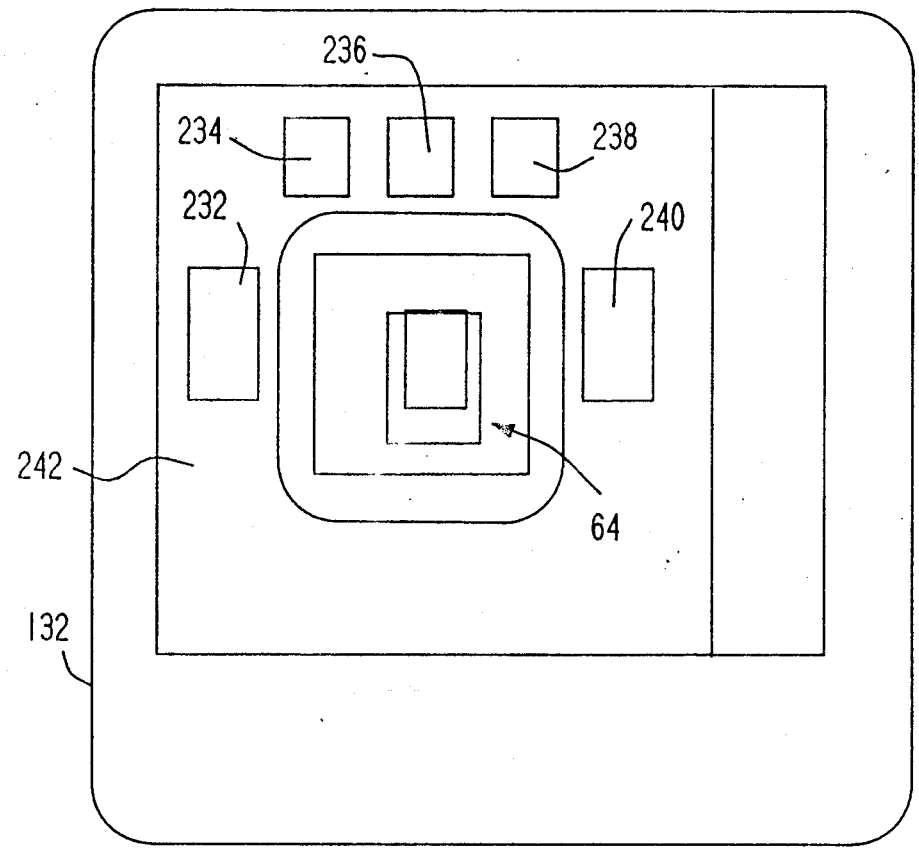
FIG. 10 is a plan view of a modified pointing device showing optional button switches for use with the circuit of FIG. 9.

The phototransistor 124, which senses the depression of the button 78, is connected via an inverter 220 to an input of the computer 184. This switch or button status data is also applied by resistor 221 and transistor 223 to an output of the point for use by computers require separate switch condition lines. Additional inputs to the computer 184 are provided by a plurality of strap or jumper connections 222 which are normally biased positive by resistances 224, an input from a clock circuit 226 which has a frequency selected to read the quadrature inputs at a rate which exceeds the rate of generation during normal fast pointer movement, and inputs from optional normally open push button switches 230, 232, 234, 236 and 238 which are normally biased positive by resistances 240. These optional push button switches are illustrated in FIG. 10 which includes a membrane switch assembly 242 mounted on top of the enclosure 132 adjacent to the finger-grippable element 64 so that the switches 232, 234, 236, 238 and 240 may be readily operated by a finger of the operator. More or less of these switches 232, 234, 236, 238 and 240 may be provided. Also output lines (not shown) may be provided for the switches 230, 232, 234, 236 and 238 when a computer requires such lines. Outputs of the computer 184 are connected to inverters 242, 244, 246 and 248 for producing quadrature outputs which may be employed by some computers; for example, several types of computer employ mouse devices which generate quadrature signals to control cursor movement, and the outputs of the inverters 242, 244, 246 and 248 can be connected to inputs of such a personal computer to replace such a mouse device. The computer 184 also includes a serial output which is connected by a driver 250 to an output line which can then be connected to a receive pin of a serial port of a personal computer. A serial input line 252 is connected to the computer 184 so that the serial transmit terminal of the serial port of the personal computer can transmit instructions and data to the pointer device.

Figure 12:
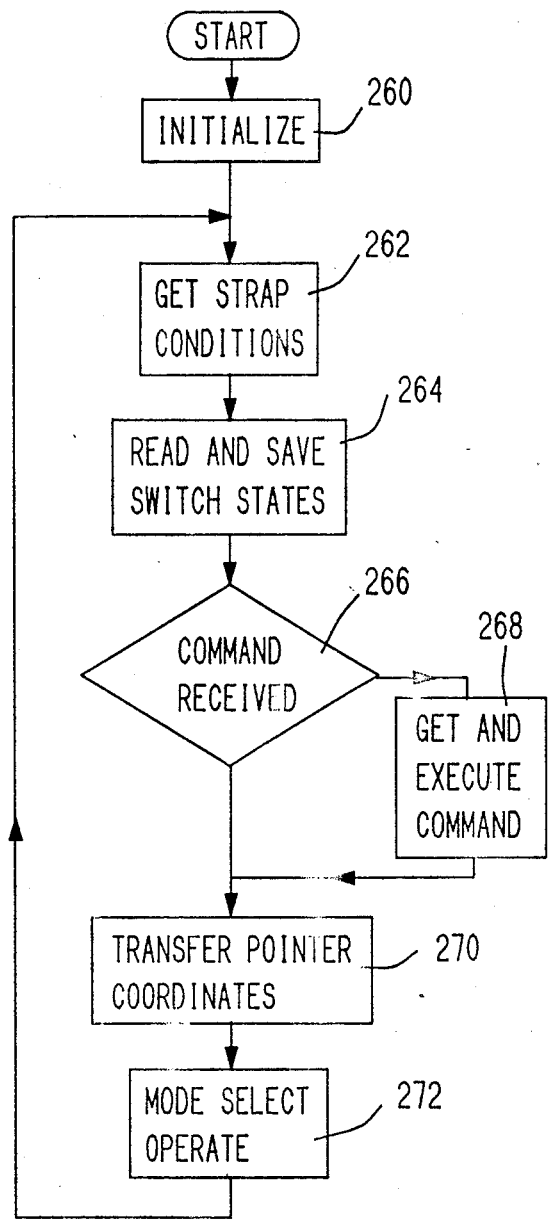
FIG. 12 is a step diagram of a main computer procedure employed by a pointing device computer in FIG. 9.

The computer 184 contains a ROM which contains its operating program. The main program loop of the computer 184 is illustrated in FIG. 12. Upon reset produced at power up of the pointer device, the computer 184 in step 260 performs initialization of its ports, timer registers, and RAM locations used to store variables and constants utilized by the program. From step 260, the program proceeds to step 262 which is the first step of the main program loop. In step 262, the condition of the straps 222 are detected to determine the particular mode of operation of the pointer and to set various flags and various constants used in the program required by the particular mode of operation.

It is noted that although there are two basic output modes, namely, quadrature output mode and serial output mode, there are a plurality of quadrature modes and serial modes. The serial modes can be generally classified as relative modes or absolute modes. In a relative mode, the output generally corresponds to movement of the finger-grippable element of the pointer. In the absolute mode the output corresponds to the position of the finger-grippable element 64 within its rectangular area, for example, X Y coordinates. The quadrature output modes are relative type modes. Additionally, the modes can be classified as either pointer modes or user modes. In a pointer mode the output will correspond to the actual count or differential in count from the last output stored by the computer 184 based upon changes made in the quadrature input signals. In user modes, the actual pointer count or the differential in pointer count is converted into a user scale, for example, by multiplying or dividing the actual count or differential. Additionally, user output modes include a zoom mode wherein movement of the finger-grippable element under certain conditions is translated into movement of the cursor or marker within a small portion or area and where incremental change in cursor position varies with a detected pointer rate of movement or a pointer position in an outer ring of its area of movement.

In the next step 264 the condition of the switches, including the output of the phototransistor 124 which detects the condition of the handle button 78, together with the switches 230, 232, 234, 236 and 238 is detected and stored.

In step 266 the computer determines if a complete instruction, which may be formed by several data words, has been received in an input buffer, and, if so, the program branches to step 268 where the command is executed. The receiving of bytes over serial line 252 is handled by an interrupt procedure (FIG. 22) described below. The commands can change the serial band rate, can change the operating mode or can change the rate or scale that the output bears to incremental movement of the finger-grippable element. When a command changes the operating mode it will override the mode selected by the strap condition step 262. Thus, the user program can send a command to the pointer device to have the pointer device generate an output on a scale and format which the user program desires.

Following step 266 or step 268 if step 266 is true, the program proceeds to step 270 where pointer coordinates are transferred from an input buffer to a program buffer. An input count, or X and Y coordinates, are maintained in an input buffer in accordance with an interrupt procedure. However, since this count can vary based upon quadrature input readings during interrupts which occur at a rate of clock 226 which can be substantially faster than the cycle time of the program of FIG. 12, the program in step 270 reads this input buffer and stores the reading in a program buffer which is changed only during step 270 in the cycle of FIG. 12. Thus, the main computer program and its procedures are not affected by changes in the count occurring during movement of the finger-grippable element during steps of the main cycle.

In the following step 272 the computer then examines the computer coordinates transferred in step 270 and makes the appropriate conversions in accordance with the mode of operation as determined by step 262 or 268. Also the program in step 272 transfers pointer coordinates, pointer differential, user differential, or user coordinates to an output buffer and initiates interrupt controlled procedures which operate either the quadrature outputs or the serial outputs of the computer 184.

The interrupt procedure for maintaining the input count from the quadrature input is illustrated in FIG. 14. This interrupt procedure is called by the clock 226 which is set to have a frequency designed to read the quadrature inputs at a rate equal to or greater than the fastest rate of change in the quadrature input produced by the operator moving the finger-grippable element, for example twenty-five kHz. In the first step 280, the quadrature inputs of computer 184 are read. In step 282 these inputs are then compared to the previous input and if the same, the program executes a return from interrupt to return to the program step where the interrupt occurred. If step 282 is false, the program then proceeds to step 284 where a determination is made about whether the count in the input buffer should be incremented or decremented, i.e., whether the quadrature input indicates that the finger-grippable element is being moved in the positive or negative direction of the corresponding X or Y direction. In FIG. 13 there is illustrated the changes that can occur over 1¼ cycles of the A and B inputs of the X quadrature inputs. It is noted that the up direction is always characterized by the A bit being equal to the previous B bit, whereas the down direction always has the A bit not equal to the previous B bit. Thus, if the A bit is equal to the previous B bit in step 284 the program proceeds to step 286 where the count in the input buffer is incremented. Conversely, if the A bit is not equal to the previous B bit the program proceeds to step 288 where the count in the in the input buffer is decremented. From step 286, the program proceeds to step 290 where the count in the input buffer is compared with the maximum allowable count, e.g., 324, and if the count exceeds the maximum count the program proceeds to step 292 where the count is set at the maximum count. If the count was decremented in step 288, the program proceeds to step 294 where the count is compared with zero and if less will proceed to step 296 where the count is set to zero.

It is noted that steps 282, 284, 286, 288, 290, 292, 294 and 296 illustrate the maintenance of the count in one buffer or one coordinate direction, such as the X direction. These steps are repeated for each additional coordinate direction such as the Y direction.

During initialization of the computer in step 260 of FIG. 12, the input buffers for the X and Y directions are initially set to one-half the maximum count, i.e., the finger-grippable element is assumed to be centered within its area of movement. An operator can initially move the finger-grippable element to the four edges of the square area of movement and the steps 290, 292, 294 and 296 of the corresponding X coordinate and Y coordinate procedures will adjust the corresponding X and Y counts s that these counts accurately reflect the X and Y position of the finger-grippable element within its area of movement.

Figure 15:
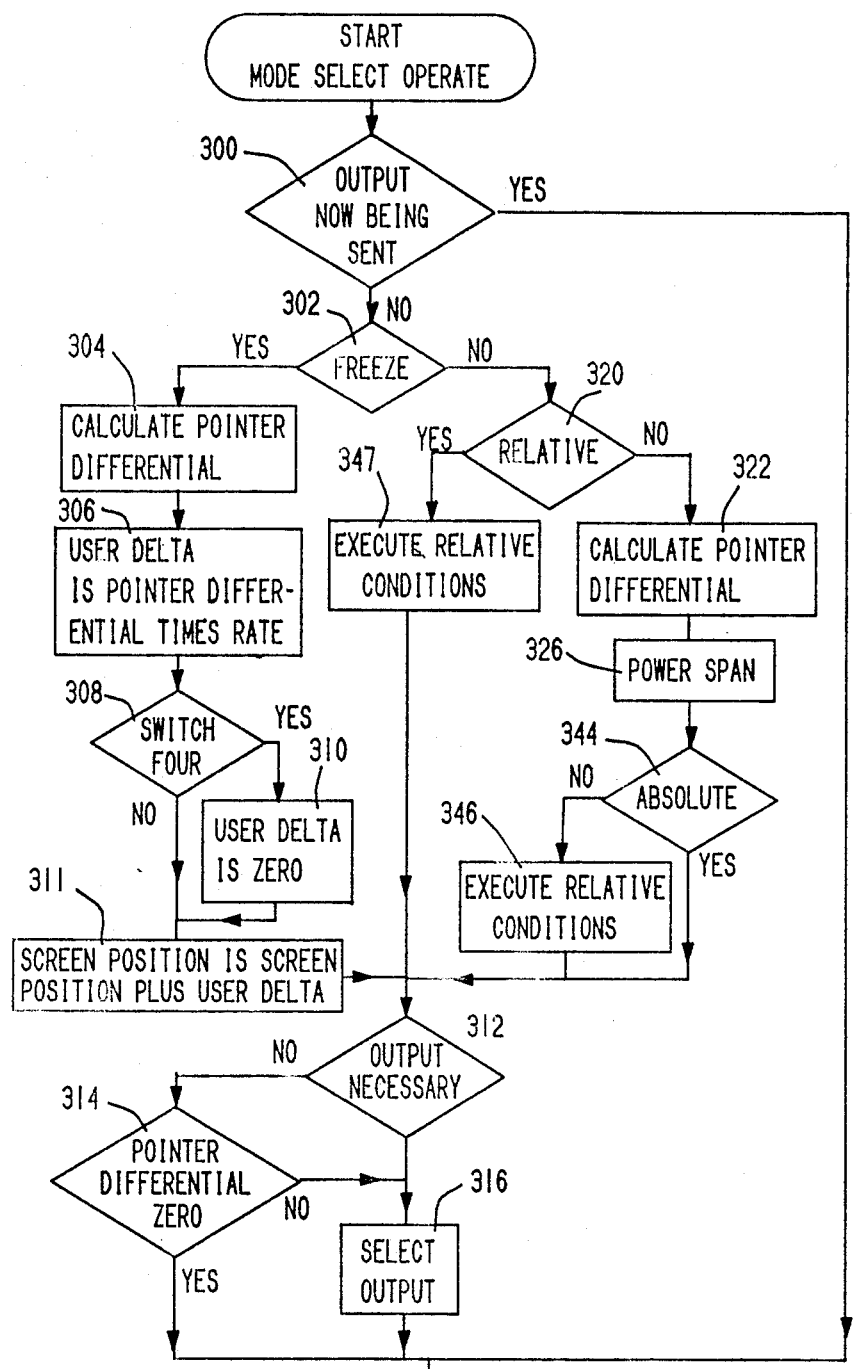
FIG. 15 is a step diagram of a mode select operate procedure employed in the program of FIG. 12.

The mode select operate subroutine 272 of FIG. 12 is illustrated in detail in FIG. 15. Initially in step 300 if flag conditions are set indicating that output is currently being processed or sent the program proceeds directly to return to avoid changing the output information before it is completely sent. If step 300 is false, then the program in step 300 determines if the mode is a freeze mode. A freeze mode is a mode wherein the output is directly proportional to the pointer differential or position coordinates as opposed to other modes where the output can be a function of a power span mode. If the freeze condition is true, the program proceeds to step 304 where the pointer differential is calculated by subtracting the old pointer coordinates from the new coordinates transferred in step 270. Next, in step 306 the differential values computed in step 304 are used to calculate user delta values by multiplying the pointer differential by the rate. This rate or step value is set by initial strap and default conditions or by a command received in step 268 of FIG. 12 from a user program. Following step 306, the program, in step 308 tests for the operation of a switch, such as switch four, designated as a mouse lift switch, and if the switch is operated the user delta is set to zero in step 310. Steps 308 and 310 permit the finger-grippable element to be retracted or otherwise moved with the switch four such as one of the switches 232, 234, 236, 238 and 240 depressed and held depressed without corresponding cursor movement. When the switch is then released upon return, the finger-grippable element may be again advanced in the same direction to continue moving the display marker or cursor. This is analogous to operation of a mouse wherein the edge of the pad or area of its movement on a table is reached and the mouse is then lifted and moved back into its area of movement so that it can be again moved in the desired direction until the marker or cursor on the display reaches the desired position.

From step 310 or from step 308 if false, the program proceeds to step 311 where the user delta is added to the old screen position to determine the new screen position. In the next step 312 it is determined if output is required. A first condition requiring output can be a change in a switch when such switch change conditions must be sent to the personal computer from the pointing device. A second condition can be if the pointing device has received a command requesting the pointer to send its positional information or switch information. A third condition can be that the pointing device is being operated in a continuous mode wherein positional information is continuously sent to the personal computer. A fourth condition is set forth in the following step 314 wherein the output will be sent if the pointer differential is greater than zero and the mode requires this information to be sent. Thus, from step 312 if true or from step 314 if false the program proceeds to a select output procedure 316 where the output of information is initiated.

If step 302 is false the program will proceed to step 320 wherein the condition of a relative flag being false causes the program to branch to step 322 wherein the pointer differential is calculated in the same manner as step 304. From step 322 the program proceeds to step 324 wherein the power span procedure of FIG. 18 is called.

In the power span procedure 324, as illustrated in FIG. 18, a determination is made in step 326 if the pointer coordinates indicate that it is within an outer ring. For example, see FIG. 19 which shows that the area of movement of the finger-grippable element can occur within a square area which has X coordinates ranging from zero to 324 and Y coordinates ranging from zero to 324. The region surrounding the dashed square 328, which, for example, defines an outer ring wherein either the X or Y coordinate is less than 80 or wherein the X or Y coordinate is greater than 244. If, in step 326 the position of the finger-grippable element or pointer 64 is not within the outer ring, i.e., both the X and Y coordinates are greater than 80 and less than 244, then the program proceeds to step 332 where the pointer differential is compared with a threshold. This step 332 determines if the rate of movement of the pointer 64 exceeds a predetermined value.

If step 332 is false the program proceeds to step 334 wherein the pointer differential calculated in step 322 of FIG. 15 is used to determine a rate from a table illustrated in FIG. 20. Then in the following step 336 the user differential is calculated to be the normal step or rate times the table value determined in step 334 divided by 10. The steps 334 and 336, as well as the table values in FIG. 20 are designed so that for relatively slow movement of the pointer 64, the user coordinate positions are changed so that the position of the cursor or marker is changed by a correspondingly small increment to enable fine positioning of the cursor or marker on the display.

If either step 328 or 332 is true, then the program proceeds to step 338 wherein the user differential is calculated as being the pointer differential times the ratio of the distance of the cursor from the screen edge to the distance of the pointer from the edge of its movement. Step 338 results in the pointer 64 being able to move the cursor 58 rapidly throughout the entire range of the user screen area. The steps 328, 332, 334, 336 and 338 of the power span procedure 326 together with the table values of FIG. 20 permit both very fine cursor positioning as well as cursor positioning without any requirement of pressing a button to change between fine and coarse positioning modes as was required by the above-mentioned prior application.

From step 336 or from step 338 the program proceeds to step 340 where the new screen position is calculated by adding the user differential calculated in step 336 or 338 to the old screen position. It is noted that the screen position is represented by X and Y coordinate values and that the user differential is represented by both X and Y coordinate changes which are positive in forward directions and negative in reverse directions along the respective X and Y coordinate axes. Step 338, or step 334 and 336, and step 340 are performed for each of the X and Y coordinates.

After the power span procedure 326, the program returns to step 344, FIG. 15, where the condition of an absolute flag is determined. When the absolute flag is true, this indicates that the coordinate values of the screen position or the pointer position are to be transmitted, and if the absolute flag is false, then relative data such as user differential or pointer differential values will be transmitted. In the case step 344 is false the program proceeds to step 346 where an execute relative conditions procedure is called. This procedure is also called from step 347 if step 320 is true.

Figure 16:
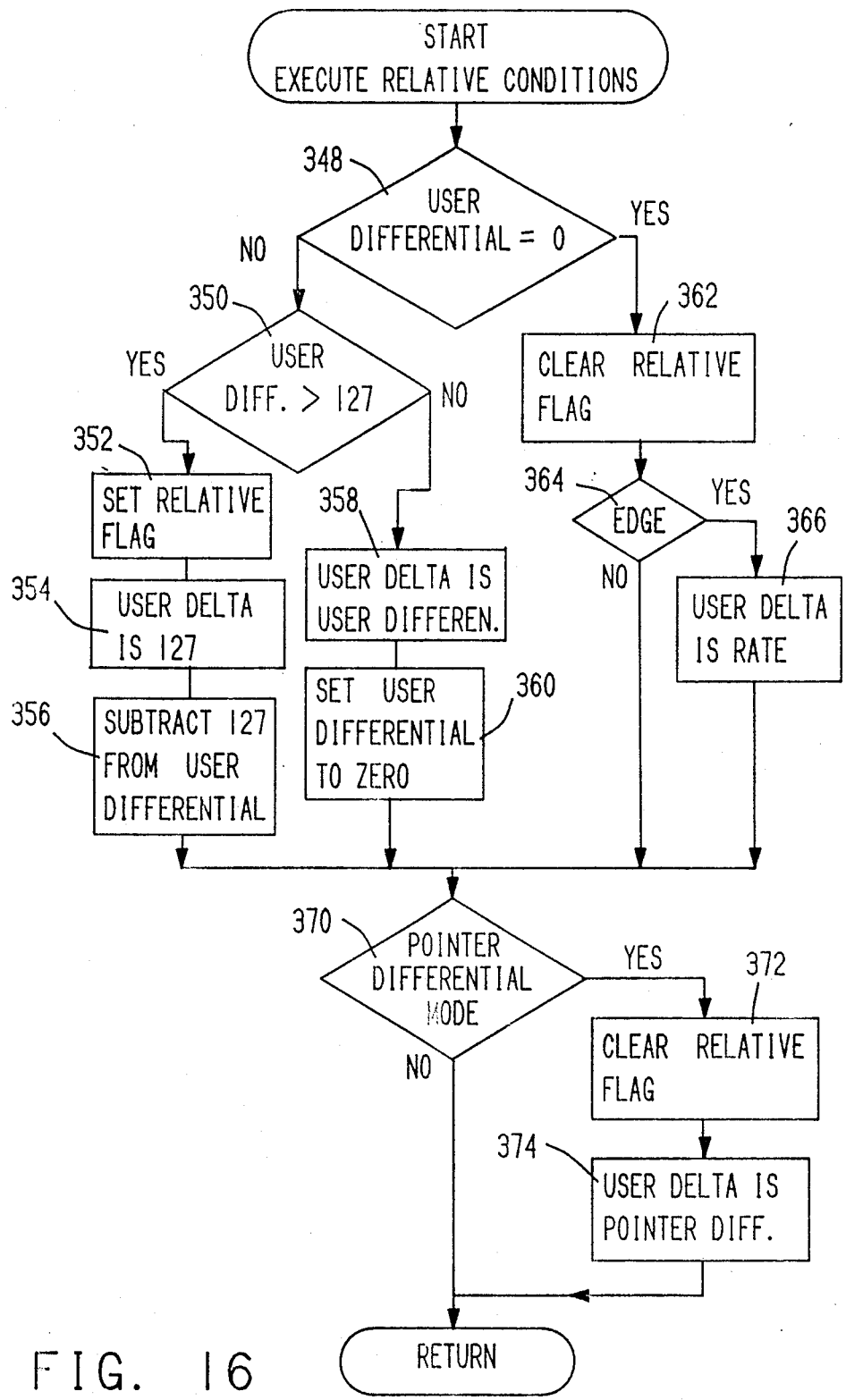
FIG. 16 is a step diagram of an execute relative conditions procedure employed in the mode select operate procedure of FIG. 15.

The execute relative conditions procedure 346 is illustrated in FIG. 16 wherein the first step 348 constitutes a determination if the user differential is equal to zero. When the user differential is greater than zero the program proceeds to step 350 where a determination is made if the absolute value of the user differential is greater than 127. If step 350 is true, the program proceeds to step 352 where the relative flag used by step 320 is set, step 354 where the user delta is set at 127, and step 356 where the absolute value of the user differential is reduced by 127. If step 350 is false, the program proceeds to step 358 where the user delta is set equal to the user differential and then step 360 where the user differential is set to zero. If in the previous step 348 the user differential has been previously made equal to zero, the program proceeds to step 362 where the relative flag used in step 320 of FIG. 15 is cleared. Steps 348, 350, 352, 356, 358, 360 and 362 of the execute relative conditions procedure 346 are employed so that the changes in cursor position in each of the X and Y directions can be transmitted by a single byte; the eighth bit of the X and Y bytes may represent the direction of movement along the corresponding X and Y axes. The setting of the relative flag in step 352 insures that the program in the procedure of FIG. 15 branches from step 320 to the step 347 so that the user differential is not recalculated until the full user differential has been transmitted by successive transmissions of user delta limited to absolute values of 127 or less. It is noted that the value of 127 of steps 350 and 354 can be more or less than 127, depending upon the particular format of the transmitted information.

From step 362 in FIG. 16 the program proceeds to step 364 where a determination is made of the pointer 64 is at the edge of its area of movement, for example, the X or Y coordinate being equal to or less about 3 or being equal to or greater than 321. If step 364 is true, the program proceeds to step 366 where the user delta is made equal to the rate or normal step employed for each pointer value. Thus, when in a non-freeze relative mode the pointer continues to transmit cursor moving data when the pointer 64 engages one of the edges of its movement.

From step 356, 360, 366 or 364 if false, the program proceeds to step 370 where a determination is made if the mode is a pointer differential mode. If true, the program proceeds to step 372 where the relative flag is cleared to insure that the pointer differential is calculated by step 322 during each pass through the mode select operate procedure of FIG. 15, and then to step 374 where the user delta is set to be equal to the pointer differential that was calculated in step 322 of FIG. 15.

Figure 17:
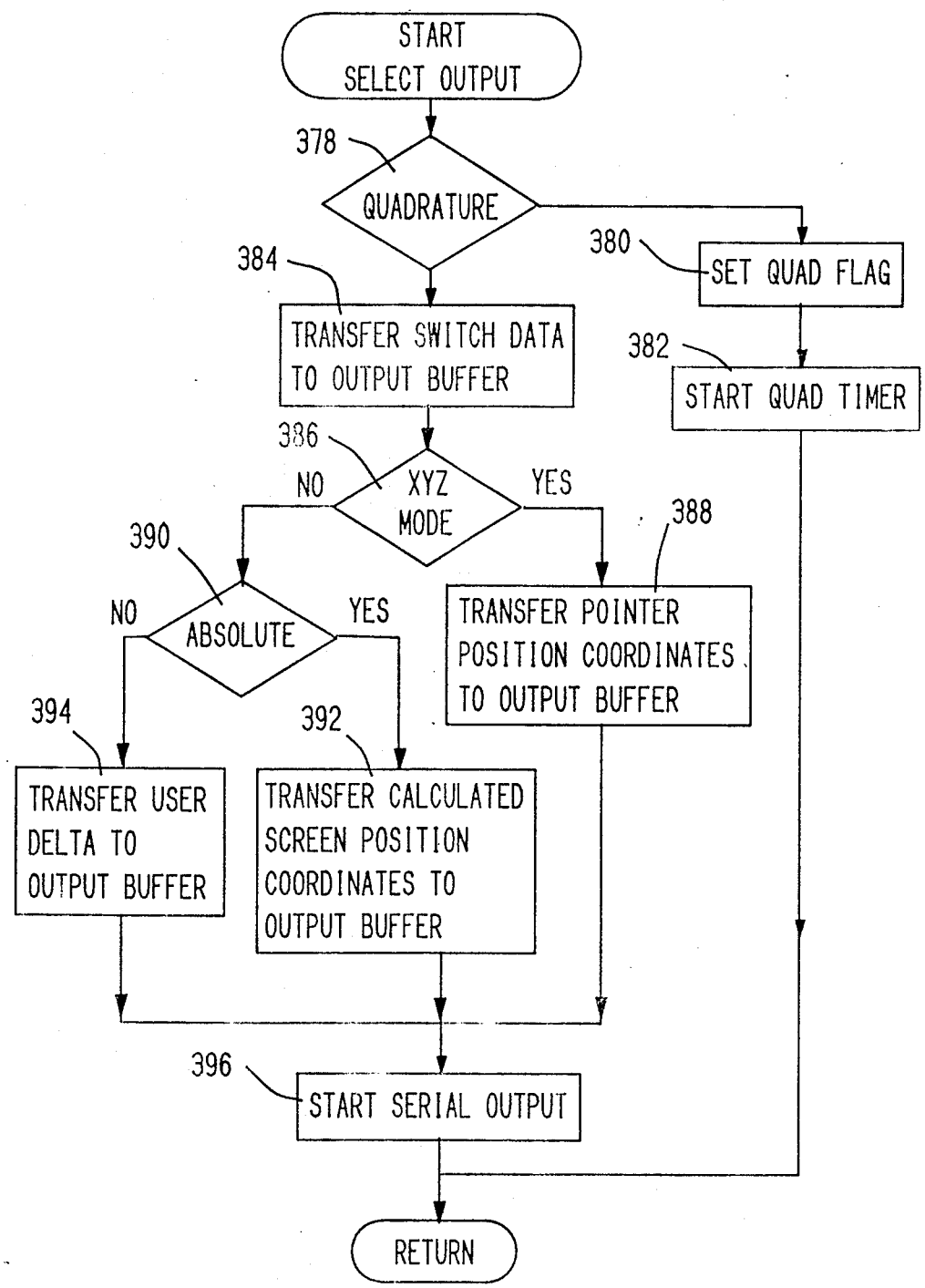
FIG. 17 is a step diagram of a select output procedure employed in the mode select operate procedure of FIG. 15.

At the end of the execute relative conditions procedure 346 or 347 of FIG. 15, the program returns to steps 312 and 314 where it is determined if the output is necessary and, if so, then to the select output procedure 316 which is shown in detail in FIG. 17. In a first step 378 the program determines if the output is to be quadrature, and if true, proceeds to step 380 where a quadrature output flag is set and then step 382 where the quadrature timer is started. If the output is to be serial rather than quadrature, the program proceeds to step 384 where the switch information determined in step 264 of FIG. 12 is transferred as a first byte to an output buffer. Following step 384, the program determines in step 386 if the mode is an X, Y, Z mode or absolute pointer position mode, and if true, proceeds to step 388 where the pointer position coordinates are transferred as succeeding bytes to the output buffer. If step 386 is false the program proceeds to step 390 where it is determined if the output is absolute or relative, and if absolute the program proceeds to step 392 where the screen position coordinate data determined in step 340 of FIG. 18 is transferred to the output buffer. If step 390 determines that the output is relative then the program proceeds to step 394 where the user delta data determined in one of the steps 354, 358, 366 or 374 of FIG. 16 is transferred to the output buffer. It is noted that for relative output the X differential value and the Y differential value are one byte each, whereas for absolute position output the X and Y coordinate values may be two bytes each. From either of the steps 388, 392 and 394 the program proceeds to step 396 where the serial output is started so that the buffer information regarding switch status and either relative or absolute X and Y coordinate data is transmitted via the driver 250 of FIG. 9 over RS-232 cable 54 of FIG. 1 to the computer 52.

Figure 21:
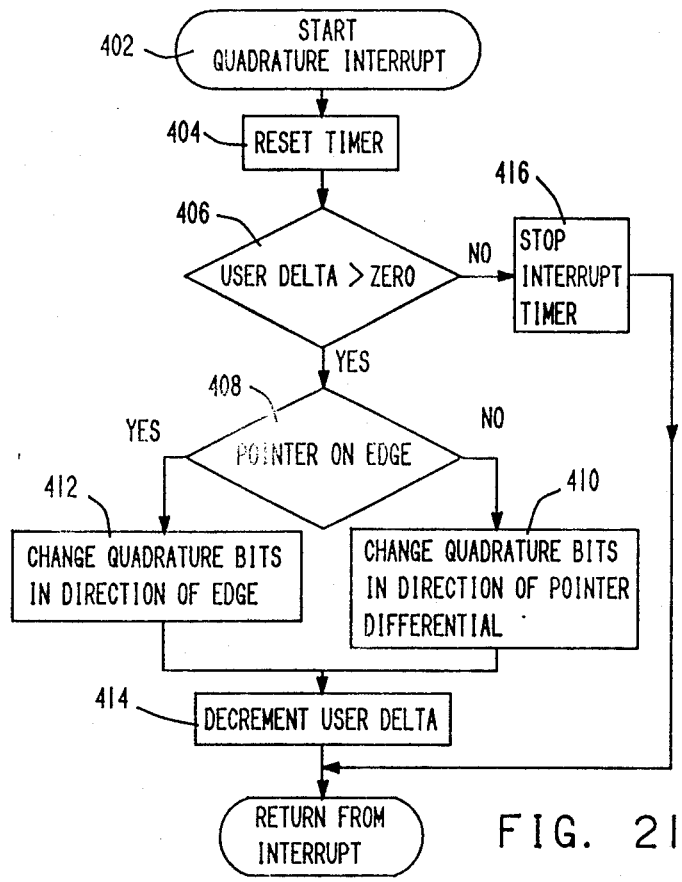
FIG. 21 is a step diagram of a quadrature interrupt procedure employed in the pointer computer of FIG. 9 for generating a quadrature output.

The generation of the quadrature output on the port outputs of computer 184 connected to inverters 242, 244, 246 and 248 is produced by an interrupt procedure which begins at 402 of FIG. 21. The quadrature interrupt procedure is initiated by an internal timer of the computer 184 which is started in step 382 of FIG. 17. In the first step 404 this timer is reset. In the next step 406 the program determines whether the user delta is greater than zero and if true proceeds to step 408 where it is determined if the pointer is on an edge. If the pointer is not on an edge the program proceeds to step 410 wherein the corresponding coordinate output ports are changed to indicate movement of the pointer in the direction as called for by the last pointer differential value. For example, see FIG. 13 which illustrates the manner of changing outputs XA and XB for corresponding upward or downward movement along the X axis. If the pointer is found to be on the edge in step 408, the program proceeds to step 412 where the corresponding coordinate outputs are changed to indicate movement in the direction of the edge. Step 412 insures that when the pointer is moved to an edge, quadrature will be generated indicating movement in the direction of the edge under conditions where the program proceeds through steps 364 and 366 of FIG. 16. It is noted that steps 406, 408, 410, 412 and 414 are steps which operate on a single coordinate value such as the X coordinate value and that they are repeated for a Y coordinate value to generate YA and YB quadrature outputs. In the event that both of the X and Y user delta values are 0 the program will proceed from step 406 for the last coordinate value to a step 416 where the interrupt timer is stopped. From step 414 or 416 the program executes a return from interrupt to return to the program step where the interrupt 402 was called.

Figure 22:
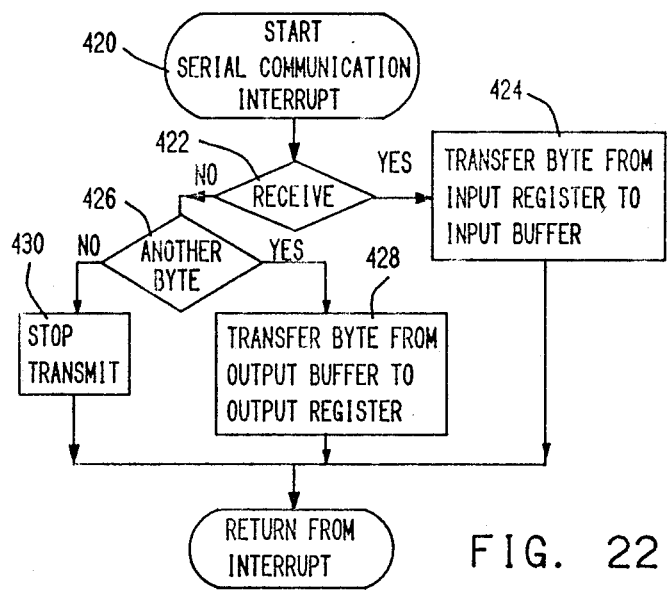
FIG. 22 is a step diagram of an interrupt procedure employed in the pointer computer of FIG. 9 for receiving and transmitting serial communication data from and to the main computer.

The serial communication is also handled by an interrupt procedure which is initiated by the serial communication registers within the computer 184. This serial communication interrupt procedure is illustrated in FIG. 22 and begins at point 420 where the program proceeds to step 422 where it is determined if the interrupt was caused by a byte being received over the serial input line 252 or whether the interrupt was caused by the completion of the transmission of a serial byte over output 250. In the former case the program proceeds to step 424 where the byte received is transferred from the serial input register and into an input buffer which is utilized by the programs in steps 266 and 268 of FIG. 12. If the interrupt was caused by the completion of transmission of a byte, the program proceeds to step 426 where it is determined if there is another byte to be transmitted and if true then the program proceeds to step 428 where the next byte is transferred from the output buffer to the output register. If step 426 is false the program proceeds to step 430 where the stoppage of output transmission is indicated.

Figure 11:
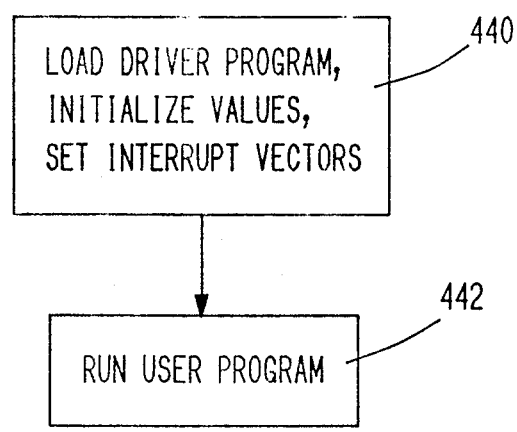
FIG. 11 is a flow chart showing general operation of the pointing device of FIG. 1 with a user program.

Referring to FIG. 11, one procedure for utilizing the pointer device 50 of FIGS. 1-10 and 12-22 is to load a driver program in the computer 52 and then to run a user program such as illustrated by steps 440 and 442 in FIG. 11. In loading the driver program various values are initialized and interrupt vectors in the computer 52 are changed so that the pointer 50 can operate the user program.

Alternatively, the user program may contain the driver for the pointer.

Figure 23:
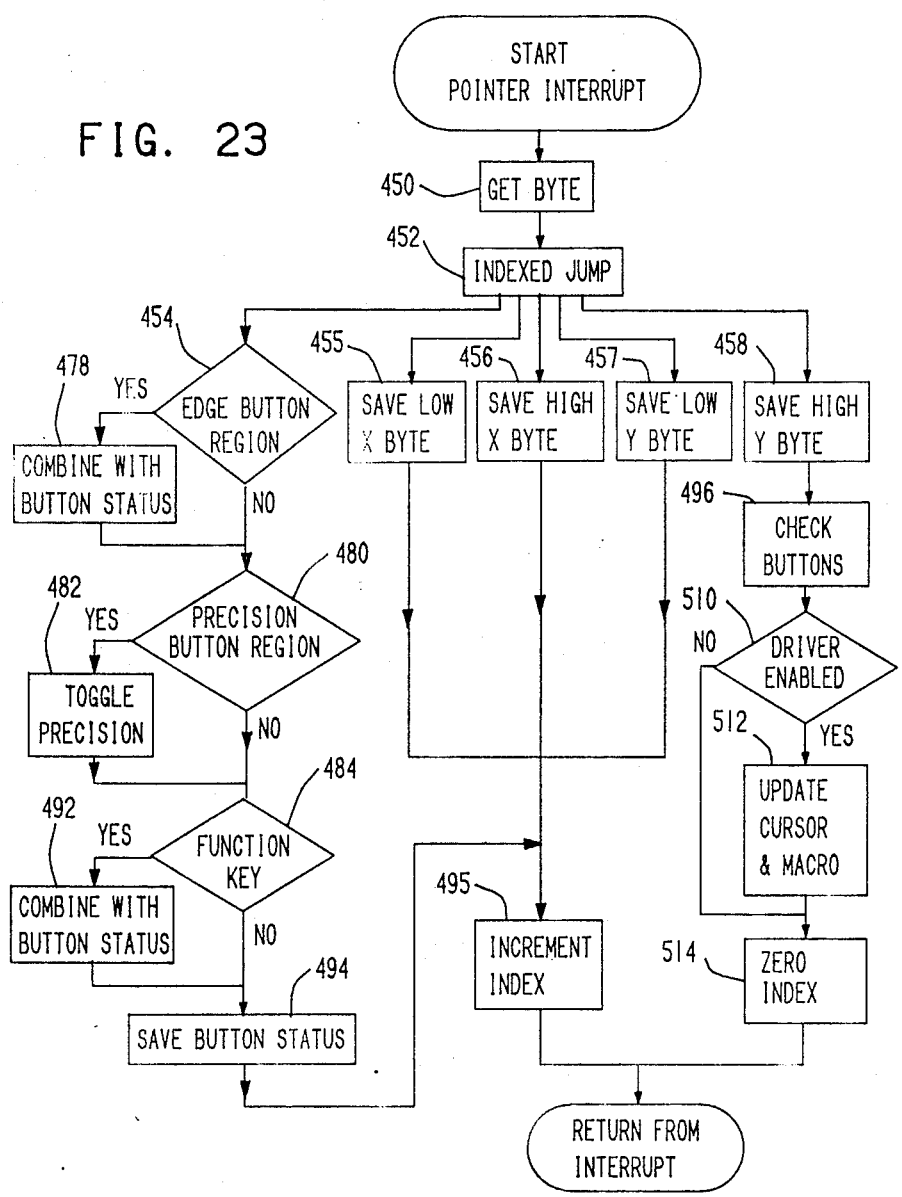
FIG. 23 is a serial pointer interrupt procedure employed in the main computer of FIG. 1 for receiving pointer information and for controlling cursor movement and passing control information to a user program.
Figure 24:
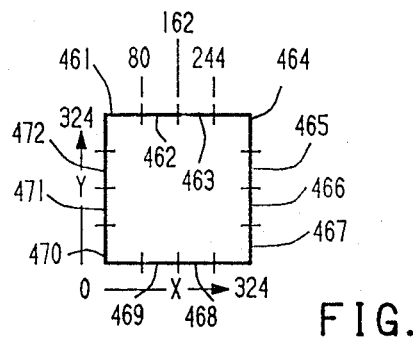
FIG. 24 is a diagram illustrating determination of edge regions of a pointer area of movement.

An interrupt program, shown in FIG. 23, is called when a serial byte is received over cable 54 from the pointer 50. This embodiment employs a sequence of five bytes sent by the pointer 50 wherein the first byte contains information concerning push button status on the device 50, the second and third bytes contain the respective low and high bytes of X pointer coordinate position, and the fourth and fifth bytes contain the respective low and high bytes of Y coordinate information. The procedure saves a count or index of the number of bytes received and after retrieving the byte from the input register in step 450 uses an indexed jump in step 452 to jump to one of the steps 454, 455, 456, 457 and 458 in accordance with whether the byte was the first, second, third, fourth or fifth byte of the series of bytes sent by the pointer device 50. The pointer device 50 has its straps set, or is commanded by serial transmission from the computer 52 during initialization step 440, such that the pointer device is in either the X, Y, Z mode to call step 388 of FIG. 17 to transfer pointer position coordinates to the output buffer upon a change in button status or position of the finger-grippable element 64 or in an absolute freeze mode to call step 392 of FIG. 17 where the data from the pointer is a product of the pointer position coordinates times a user rate or step. In the particular procedure employed in FIG. 23, an embodiment of the pointer device shown in FIG. 2 is employed which does not include any of the membrane switches 232, 234, 236, 238 and 240 of FIG. 10. Instead, additional buttons, where desired by the user program, are designated by one or more edge regions. As shown in FIG. 24, the previous X and Y coordinate data received by the computer 52 from the pointer indicates a particular position of the finger-grippable element 64 within a square area of movement. When the pointer is at an edge of its area of movement, for example when the X or Y value is equal to or less than 4, or equal to or greater than 320, then the pointer will be within one of twelve edge regions 461-472 defined around the periphery of the area of movement. These edge regions are selected so that four of the regions 461, 464, 467 and 470 are defined by the respective corners of the area of movement which are easy to determine by the user by feel in moving the finger-grippable element 64 since the corners can be easily located. Further areas on either side of each corner area, such as edge regions 463 and 465 on the opposite sides of the corner region 464 are readily locatable by simply moving the pointer 78 from the corner 464 along the upper edge of movement to region 463 or along the right edge of movement to region 465. Thus, conveniently the regions along each edge can be formed by dividing the maximum coordinate lengths to four equal divisions; for example if the Y coordinate of the pointer is equal to or greater than 320, an X coordinate value between 0 and 80 indicates that the pointer is at edge region 461, an X coordinate value between 80 and 162 indicates that the pointer is in edge region 462, an X coordinate value between 162 and 244 indicates that the pointer is in edge region 463 and an X value greater than 244 indicates that the pointer is in edge region 464. Furthermore, pressing of one of several keys, such as the control key, the left shift key, the alternate key and the right shift key can be used to multiply the number of regions, for example to 60 possible edge regions. In this example edge regions 1–12 are defined with no keys depressed, edge regions 14–24 are defined when the control key is depressed, edge regions 25–36 are defined when the shift left key is depressed, edge regions 37–48 are defined when the alt key is depressed, and edge regions 49–60 are defined when the right shift key is depressed.

One or more of these 60 edge regions can be designated as a button region. Thus, step 454 determines if the pointer is in an edge region designated as a button, and if true, proceeds to step 478 where the button status information is changed to indicate that this edge button has been selected. This edge button region is utilized in the same manner as if one of the buttons 232, 234, 236, 238 and 240 of the embodiment of FIG. 10 had been depressed and this information contained in the first input byte.

From step 478 or step 476 if false, the program proceeds to step 480 where it is determined if a precision button region has been selected. One of the 60 edge regions can be designated as a precision button, which when selected proceeds to step 482 where the precision status is toggled. Precision status concerns fine and coarse cursor positioning modes. In the fine positioning mode the movement of the pointer 64 within its area of movement results in moving the cursor 58 within a small region, i.e., only a small portion of the total screen area of the display 58, so that the cursor 58 may be very precisely positioned, such as for use with forming drawings and the like on the display.

In the next step reached after step 482 or step 480, if false, the status of one or more selected function keys is determined. This status results from a procedure illustrated in FIG. 27 and to which the normal keyboard interrupt of the computer 52 is directed by changing the corresponding vector during initialization. In the interrupt procedure the first step 486 determines if the interrupt was caused by pressing one of the selected function keys and if true proceeds to step 488 where this change in function key status is saved after which the program executes a return from interrupt. If a designated function key has not been selected then the program proceeds to step 490 where the interrupt procedure jumps to the normal keyboard routine handling the interrupt so that pressing of other keys are handled in a conventional manner. Referring back to FIG. 23, if the status recorded in step 488 indicates that a selected function key or keys have changed condition, then the program proceeds to step 492 where these function key changes are recorded and may be utilized as additional push button data or macro selection.

From step 492 or step 484 if false, the program proceeds to step 494 where the button status is saved, and then to step 495 where the index or count of the bytes received is incremented after which a return from the serial input interrupt is performed to return to the program where the interrupt occurred.

Upon receipt of the next byte, corresponding to the low byte of the X coordinate, the program of FIG. 23 jumps in step 452 to the step 455 where this byte is saved. From step 455 the program proceeds to step 495 where the index count is incremented. Similarly, steps 456 and 457 result in saving of the high byte of the X coordinate and saving of the low byte of the Y coordinate followed by incrementing of the index count in step 495.

When the last byte is received and saved in step 458 the interrupt procedure then proceeds to process the received information. The first step 496 following step 458 is a check button procedures which is illustrated in detail in FIG. 25. If in a first step 498 of the button procedure the program determines if a button status, such as the pointer button 78 or one of the function keys, has changed. If true, the program proceeds to step 500 where it is determined if a macro should be picked. A macro is an instruction or series of instructions to be sent to the keyboard buffer for use by the user program. If the pointer or finger-grippable element 64 is in one of the 60 edge regions, and if the program is not waiting for the selection of a point after picking a macro, the program proceeds to step 502 where a macro picked flag is set. Certain macro instructions may require that the instruction be performed at a desired point on the screen. In that case, once the macro has been selected, step 500 is false and the program will proceed to step 504 where a subsequent button operation will result in a true and proceed to step 506 where a point picked flag is set. From step 502 or step 506 the program proceeds to step 508 where the pointer position or X and Y coordinates are saved for use by the user program. From step 508, step 498 if false, or step 504 is false, the program returns to the procedure of FIG. 23.

In step 510 the program determines if the cursor control and macro operating portions of the driver program are enabled and if true will perform the procedures of step 512 where positioning of the cursor or display marker is performed and where macro instructions are displayed and selected. Following step 512 or step 510 if false the program proceeds to step 514 where the index count is reset to zero to ready the driver to receive the next sequence of data from the pointing device. From step 514 the program executes the return from interrupt to return to the program where the interrupt was called. Some user programs may utilize the values saved in steps 494, 455, 456, 457 and 458 for moving the cursor or marker and for performing program functions.

Figure 29:
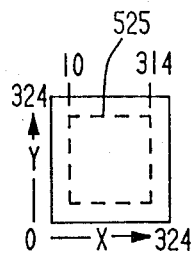
FIG. 29 is a diagram of a pointer area of movement employed in the power span procedure of FIG. 28.
Figure 28:
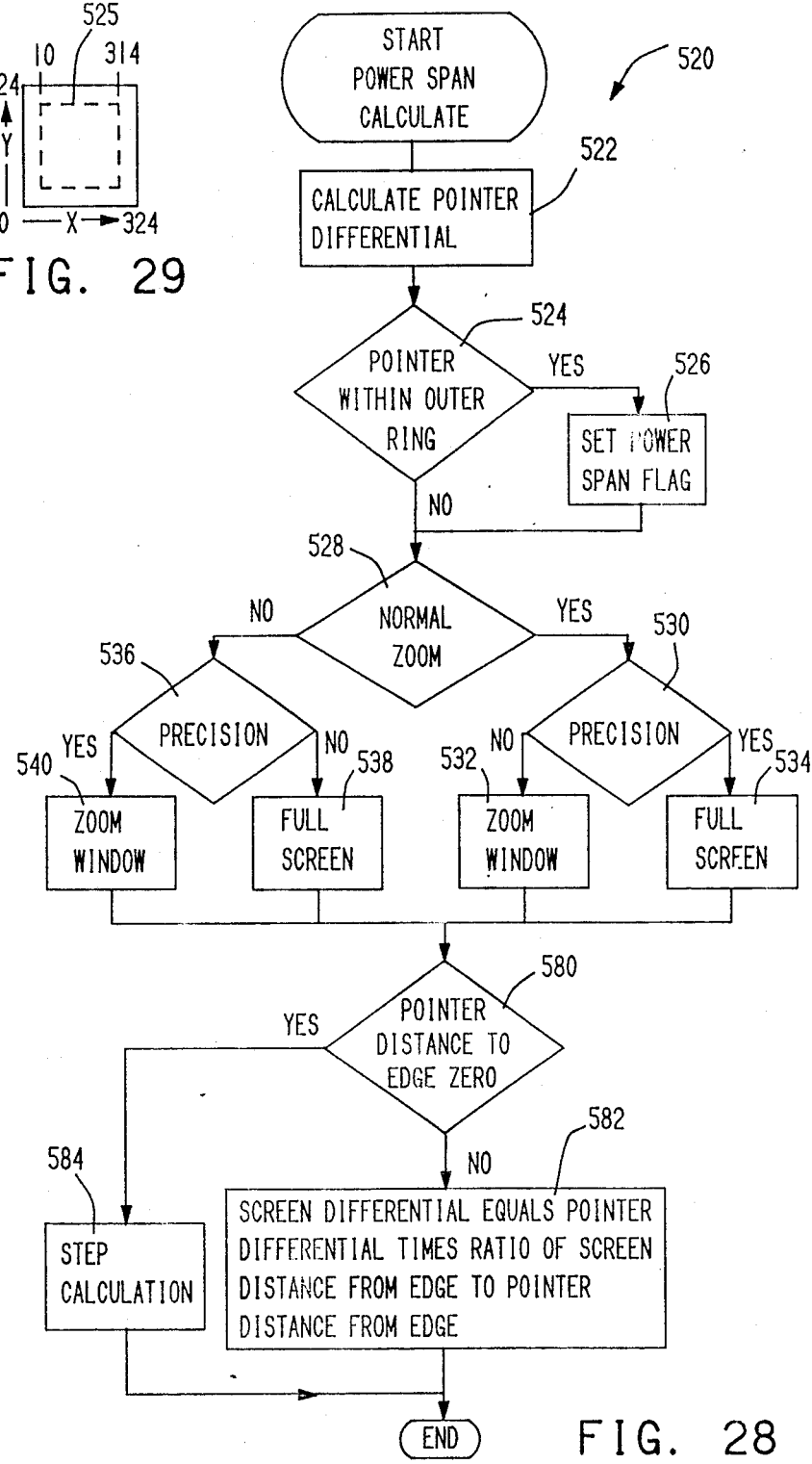
FIG. 28 is a step diagram of a power span calculation procedure employed in the update cursor and macro procedure of FIG. 26.

The main update cursor and macro procedure 512, as shown in FIG. 26 begins with step 520 which is a power span calculation procedure shown in detail in FIG. 28. In the first step 522 of the power span procedure the pointer differential is calculated for the X and Y coordinates by subtracting the previous coordinates from the new coordinates just received in steps 455-458 of FIG. 23. In the next step 524 it is determined whether the pointer 64 is within an outer ring of the pointer area movement such as shown by the dashed line 525 of FIG. 29. It is noted that this step is substantially similar to the step 328 employed in the pointer power span procedure of FIG. 20. It is also noted that the width of the ring has a value which is predetermined and which is selected in accordance with the user's desire to provide for full movement of the cursor or marker within the screen area while providing a sufficient area for fine cursor adjustment. If the pointer is within this outer ring, step 524 is true and the program proceeds to step 526 where a power span flag is set indicating a power span mode. The program then proceeds to step 528 where the program determines whether the particular application or user parameters call for a normal zoom procedure wherein fine cursor adjustment occurs in the absence of a precision flag, set in steps 480 and 482 of FIG. 23, and wherein coarse cursor adjustment or movement occurs when the precision flag is set. During normal zoom the program branches to step 530 where the zoom window procedure 532 is selected if the precision flag is clear and the full screen procedure 534 is selected if the precision flag is set. If the application requires the opposite condition, the program will branch to step 536 where full screen procedure is called in step 538 with the precision flag clear and the zoom window procedure is called in step 540 with the precision flag set.

Figure 30:
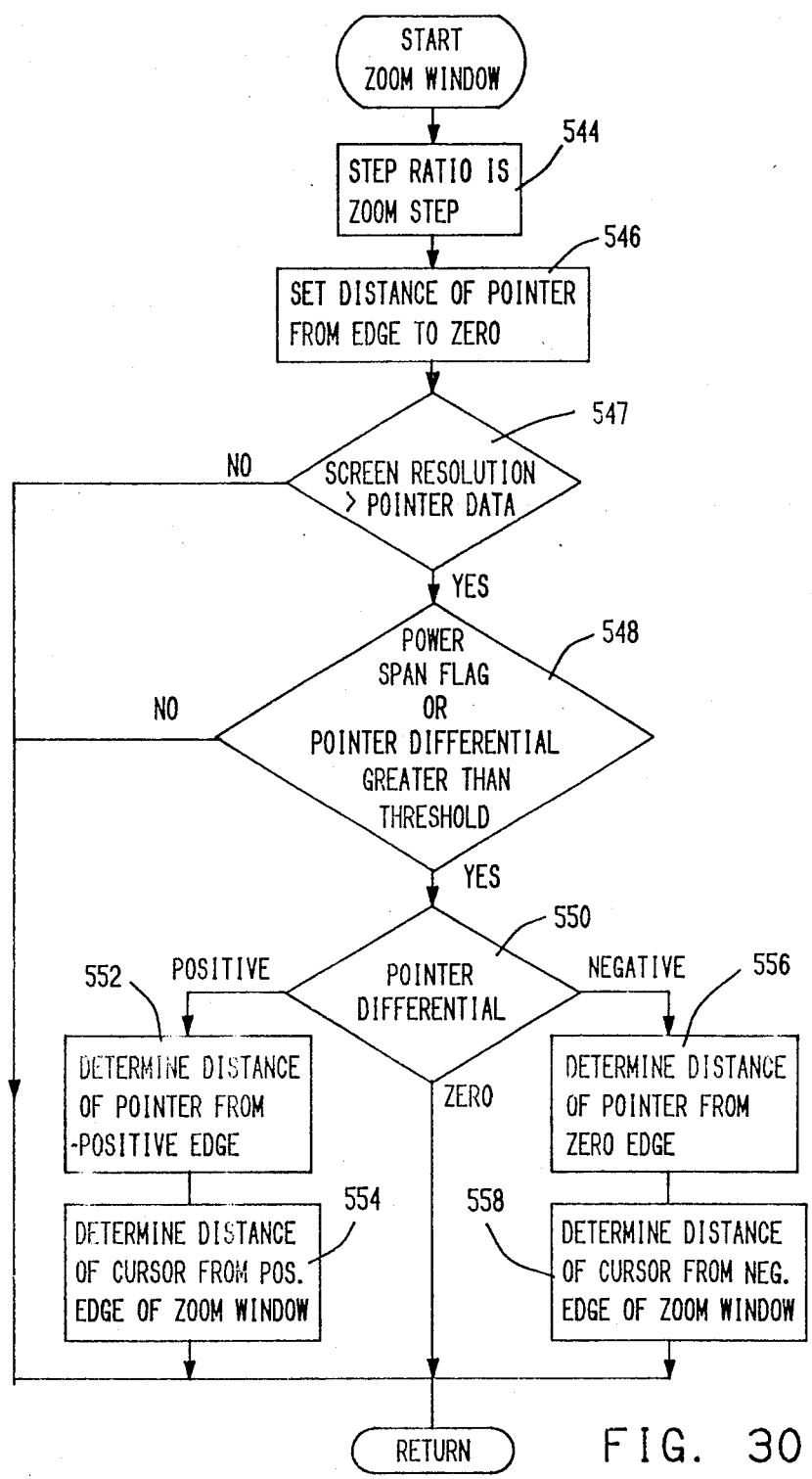
FIG. 30 is a zoom window procedure employed in the power span procedure of FIG. 28.

The zoom window procedure called by step 532 or 540 begins with step 544, as shown in FIG. 30, wherein the cursor step is set equal to the zoom step which is the number of pixels or fraction of pixels for cursor movement corresponding to each step of pointer coordinate position. It is noted that the pointer X and Y area of movement is square, whereas many computer applications employ a rectangular area of movement and thus the X step may very well be different from the Y step. The zoom step is characterized by being substantially smaller than a full screen step which is employed in the full screen procedure called by steps 534 and 538. The zoom window can be selected by the application to have maximum X and Y coordinate widths and heights equal to one-half, one-fourth, one-eighth, or other fractional portion of maximum X and Y coordinates of the full screen employed by the application and the zoom step can be correspondingly smaller than the full screen step.

In the next step 546 variables defining the distance of the pointers from an edge of the area of movement of the pointer are initialized to zero. Following step 546, the program in step 547 determines if the screen resolution is greater than the resolution of the pointer data, i.e., is the step ratio of step 544 greater than one. If false, the program executes a return to avoid any power spanning and to rendr cursor movement directly proportional to the pointer movement irrespective of the pointer position or its rate of movement. If step 547 is true, the program branches to step 548 where the program determines if the power span flag is set or if the pointer differential calculated in step 522 of FIG. 28 is greater than a predetermined threshold value. This predetermined threshold value is set so that the operator can cause a power span mode by rapid movement of the finger-grippable element 64. If either of the conditions tested in step 548 are true the program proceeds to step 550. If the pointer differential is greater than zero the program proceeds to step 552 where the distance of the pointer from the positive edge is determined and the distance of the cursor on the screen from the positive edge of the zoom window is determined in step 554. If the pointer differential is less than zero the program proceeds from step 550 to step 556 where the distance of the pointer from the zero edge isldetermined and then to step 558 where the distance of the cursor from the negative edge or zero edge of the zoom window is determined. If the step 548 is false or if the pointer differential is zero in step 550 the variables of the distances from X and Y edges will remain set to zero when the program returns to the procedure of FIG. 28.

Figure 31:
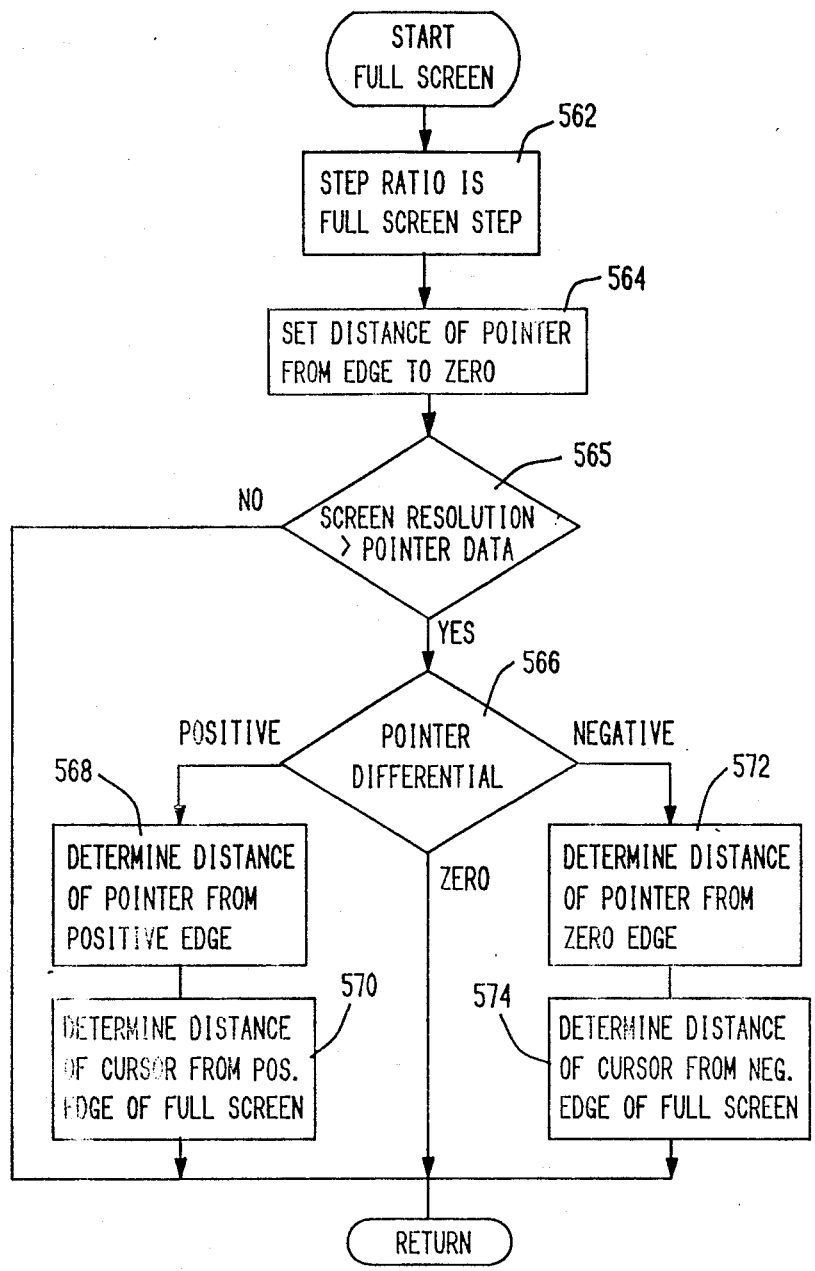
FIG. 31 is a full screen procedure employed in the power span procedure of FIG. 28.

The full screen procedure called by steps 534 and 538 of FIG. 28, as shown in FIG. 31, begins with step 562 where the cursor step is set equal to the full screen step which is larger than the zoom step used in step 544 of FIG. 30. In the next step 564 X and Y distance variables of the distance of the pointer from the edge in the direction of its movement are initialized to zero. The following step 565 determines if the screen resolution is greater than the resolution of the pointer data, i.e., is the step ratio of step 562 greater than one. If false, the program returns to which results in cursor movement being directly proportional to pointer movement. Then in step 566 when step 565 is true, the program branches to step 568 if the pointer differential is greater than zero. In step 568 the program determines the distance of the pointer from the positive edge, i.e., the corresponding X coordinate or Y coordinate of the pointer is subtracted from the maximum pointer coordinate (324). Then in step 570 the distance of the cursor from the positive edge of the full screen is determined by a similar procedure but utilizing the pixel dimension or other corresponding screen dimensional units. If the pointer differential is found to be less than zero in step 566 the program proceeds to step 572 where the distance of the pointer from the zero edge is determined, i.e., the X or Y distance is set equal to the corresponding X or Y coordinate value. Then in step 574 the distance of the cursor from the zero edge of the full screen is determined in a similar manner. If the pointer differential is zero, the corresponding X or Y variable defining the distance of the pointer from a corresponding X or Y edge in the direction of movement of the cursor is left equal to zero.

Referring back to FIG. 28, the program after completing either a zoom window procedure or a full screen procedure continues to step 580 where the program branches to step 582 if the distance to the edge determined in the zoom window or full screen procedures is greater than zero. In the step 582 the screen distance from edge is divided by the pointer distance from edge determined in the zoom window or full screen procedures to generate a quotient or ratio which is then multiplied times the pointer differential to produce the screen differential by which the cursor is to be moved in the corresponding coordinate direction. Step 582 produces the power mode where the cursor movement is proportional to the distance of the cursor from the edge of its area of movement in the direction of pointer movement, or the fractional movement of the pointer toward an edge of its movement is directly translated into equal fractional movement of the cursor toward its edge of travel.

Figure 32:
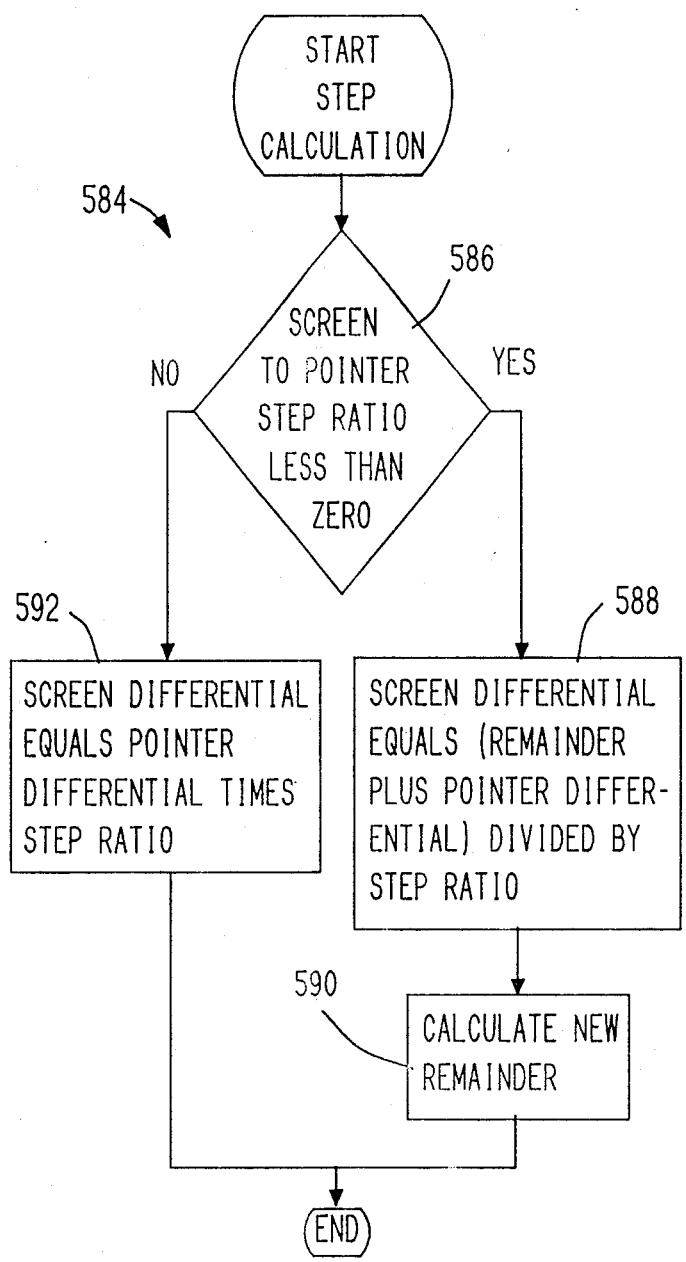
FIG. 32 is a detailed step diagram of a step calculation procedure employed in the power span procedure of FIG. 28.

If the step 580 is found true, the program proceeds to step 584 where the procedure illustrating in detail in FIG. 32 is performed. It is first determined if the cursor step, as determined in step 544 of FIG. 30 or 562 of FIG. 31 is less than zero. Step ratios less than one are set in the program as negative values which represent corresponding fractional values. Thus, a negative cursor step indicates that the movement of the cursor will be a fraction of the pointer differential. In step 588, which is called when the step 586 is true, the screen differential is determined to be the quotient produced by dividing the step ratio into the sum of the pointer differential and a remainder which was produced in step 590 from the previous calculation of step 588. Conversely, when the cursor step is greater than zero indicating that each pointer step will result in one or more screen steps, the screen differential is calculated in step 592 by multiplying the pointer differential by the cursor step ratio. The mode of cursor movement in step 584 and FIG. 32 produces cursor movement directly proportional to pointer movement. A user program by setting a desired pointer resolution via a serial instruction to the pointer device which in step 268, FIG. 12, sets its own step ratio, and then using a zoom step in step 544 of FIG. 30, can define a precision or zoom window wherein cursor movement is directly proportional to pointer movement to enable accurate and precise cursor movement in the window. Toggling the precision button will enable the operator to move the cursor and the zoom window to a different area on the full screen area of movement.

Figure 33:
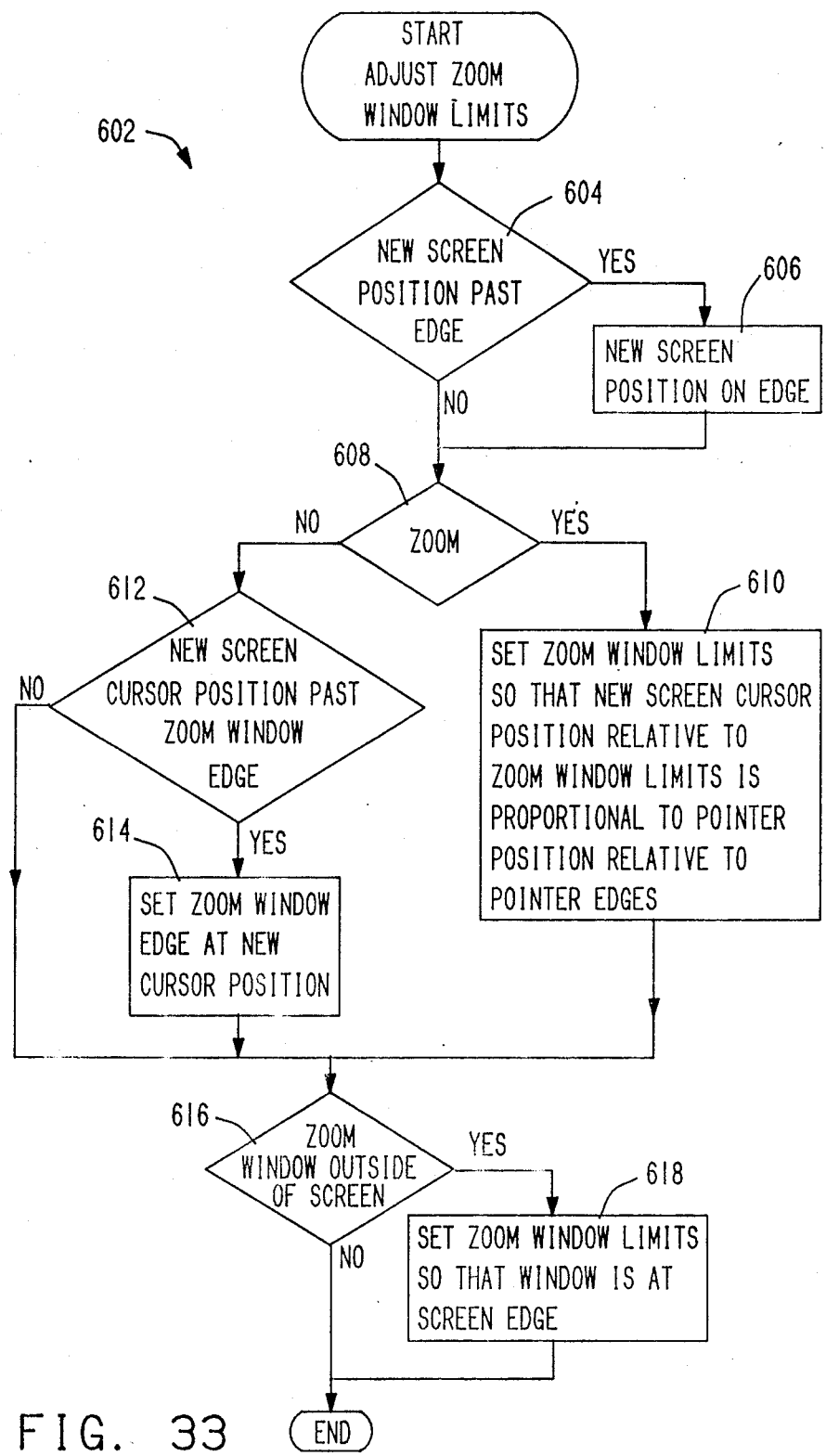
FIG. 33 is a step diagram of an adjust zoom window limits procedure employed in the update cursor and macro procedure of FIG. 26.

After the completion of the power span procedure called in step 520 of FIG. 26 the program proceeds to step 594 where the new screen position is set to be equal to the old position plus the screen differential determined in the power span procedure. Then in step 602 an adjust zoom window limits procedure illustrated in detail in FIG. 33 is called. In step 604 the new screen position coordinates determined in step 594 of FIG. 26 are compared with the minimum and maximum values of the corresponding coordinates and, if less than the minimum or greater than the maximum, are reset in step 606 to such minimum or maximum value. Then in step 608 the program either branches to step 610 or 612 depending upon whether the corresponding coordinate calculation procedure employed a zoom window procedure of FIG. 30 or a full screen procedure of FIG. 31. In the event that the corresponding coordinate was determined using a full screen procedure the program in step 610 moves the zoom window limits so that the new screen cursor position relative to the zoom window limits is proportional to the pointer position relative to the pointer edges. Thus, the window area within which fine cursor adjustments are made during a zoom procedure is carried with the cursor during coarse cursor movements. In step 612 it is determined if the new screen cursor position is past a zoom edge window, and if true the program proceeds through step 614 where the zoom window limits are readjusted so that the zoom window edge is at the new cursor position. From step 610 or 614 or from step 612 if false, the program proceeds to step 616 where it is determined if a zoom window limit is outside of a screen edge or limit. If true, the program branches through step 618 where the zoom window limits are readjusted so that the window is at the corresponding screen edge.

After returning to the procedure of FIG. 26, the program in step 620 redraws the cursor at its new position, either by accessing the normal video procedures of the computer 52 or by setting values by which the user program changes the cursor position.

Figure 34:
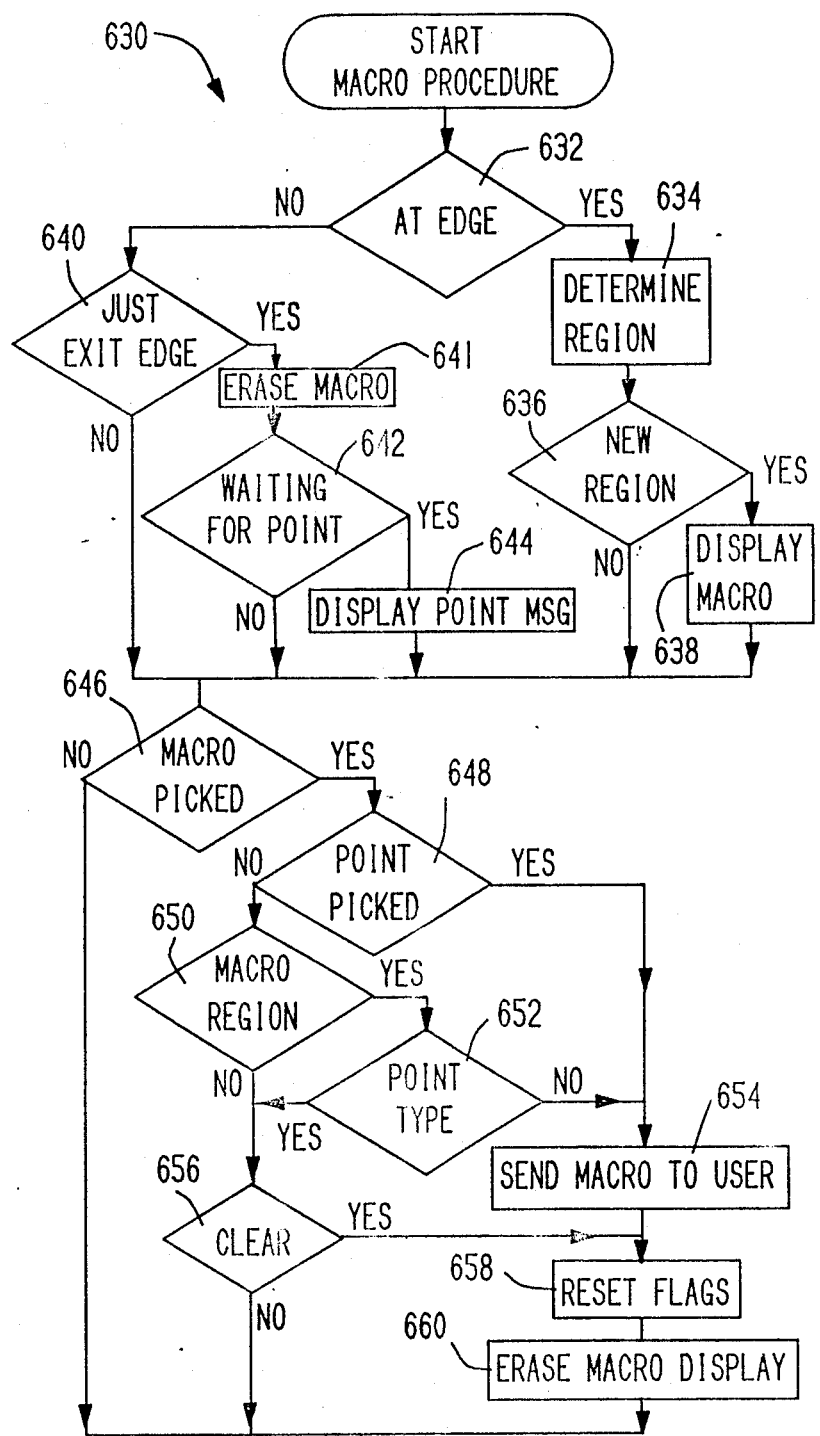
FIG. 34 is a step diagram of a macro procedure employed in the update cursor and macro procedure of FIG. 26.
Figure 35:
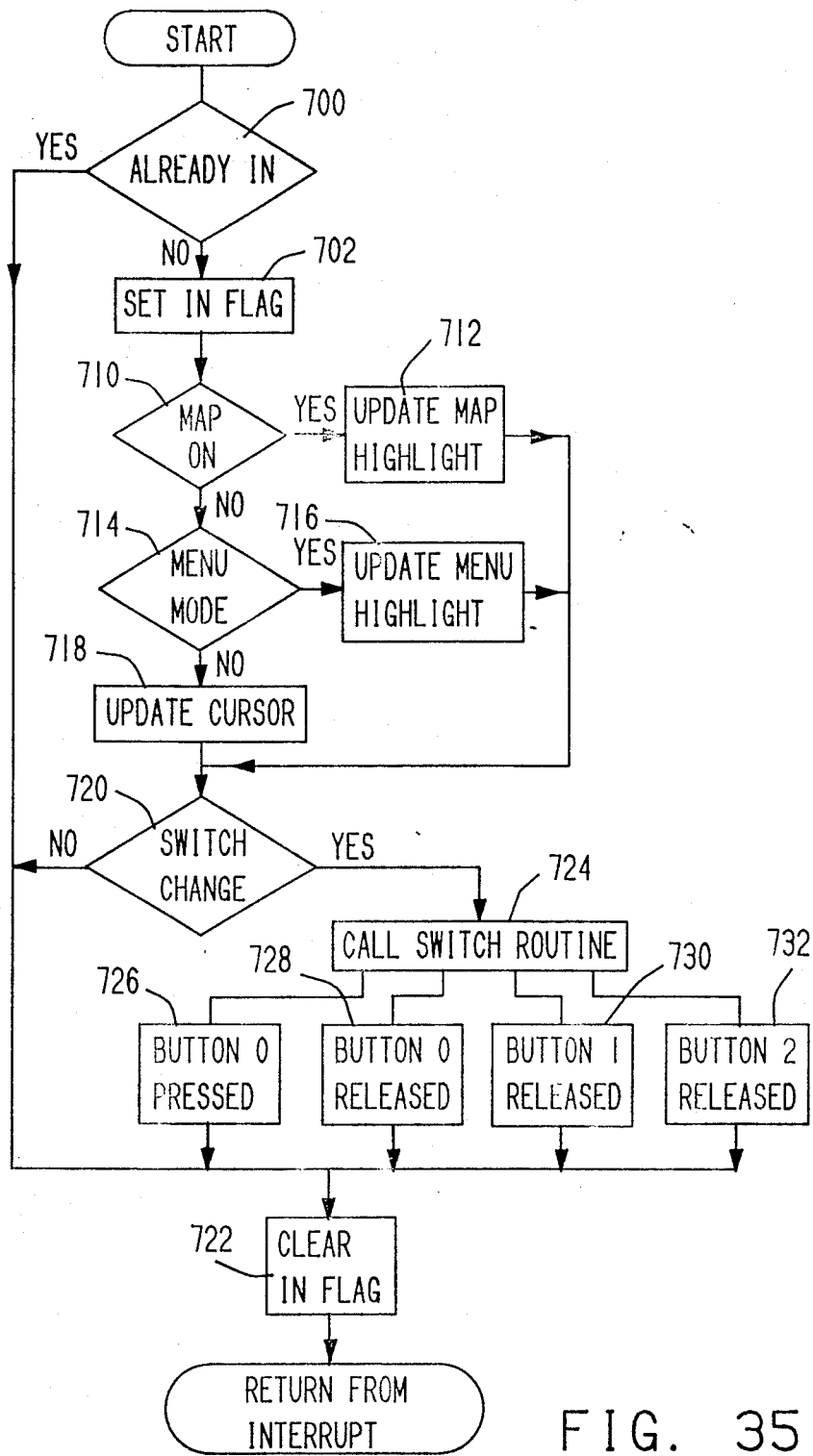
FIG. 35 is a diagram of an alternative procedure utilized in place of the procedure of FIG. 26 for utilization with a user spread sheet program.

Following the cursor adjustment, the program, in step 630 calls the macro procedure which is illustrated in detail in FIG. 34. In step 632 the program determines if the pointer 64 is at an edge of its area of movement, for example, if the X or Y coordinate is less than 4 or greater than 320. If true, the program proceeds to step 634 where the particular edge region among the 60 possible edge regions is determined as has been described above in connection with FIGS. 23 and 24. Then in step 636 it is determined if the pointer has moved into a new edge region and if true, the program proceeds to step 638 where a corresponding macro is displayed on the screen. The macros are contained within a memory file which is loaded during the initialization of the pointer driver. This file contains the actual text of the macros at locations as determined by an index table in the file. Each corresponding edge region is designated as being a macro with the corresponding text of the macro together with an indication indicating whether the macro requires specific point selection, indication if the edge region corresponds to a button together with information identifying the button, or indication if the edge region is a null region. For a null region, the step 638 will not display any macro.

If step 632 is false, the program proceeds to step 640 where it is determined if the pointer has just moved from an edge. If true, the program proceeds to step 641 where any displayed macro is erased and then to step 642 where it is determined if the program is now waiting for a point selection, i.e. has a macro been picked that requires a point and the pointer is being moved to select a point. If waiting for a point selection then the program proceeds to step 644 where a "point" message is displayed.

One procedure for displaying macros on the involves transferring the text of the macro to the keyboard input buffer of the computer operating system. This results in the macro being displayed on the command line of the program. Entry of a macro into the program generally requires the sending of an enter character such as by pressing the enter key or space bar. Thus, for displaying a macro, such characters will not be passed to the buffer so that the macro is not envoked in the user program until an enter character is passed to the buffer. Erasing the macro display is performed by passing destructive back space characters to the operating system keyboard buffer equal to the number of characters in the macro.

From step 638 or 644, or from step 636, 640, or 642 if false, the program proceeds to step 646 where it is determined if the macro picked flag is set, such as by the step 502 of FIG. 25. If a macro has been picked the program proceeds to step 648 where it is determined if the point picked flag has been set such as by step 506 in FIG. 25. If a point has not been picked the program proceeds to step 650 where it is determined if the edge region which has been picked is a macro region. If true, the program goes to step 652 where it is determined if the macro region is a point type macro region requiring the selection of a point prior to sending the macro to the user. If false from step 652 or true from step 648 the program proceeds to step 654 where the sending of the macro to the user program will be completed, for example, by transferring an enter character to the operating system buffer to actuate operation of the user program.

If step 650 is false or if step 652 is true, the program proceeds to step 656 where it is determined if there is a desire to clear any macro flags; for example a function key may be designated as a key for cancelling any macro which has been picked but for which a point is required but not yet been picked. From step 656, if true, or from step 654 the program proceeds to step 658 where the flags such as the macro picked flag and the point picked flag are reset and then to step 660 where any macro display is erased in the same manner as performed in step 641. From step 660 or from steps 646 and 656 if false, the program return to the procedure of FIG. 26 and then to the procedure of FIG. 23.

The above described drive program illustrated in FIGS. 23-34 is mainly useful for graphics type programs, such as those used to make drawings. However, the pointer device can be utilized for text type programs, and an example of a driver program for the computer 52 which can be used with a text program, such as a spread would sheet program, is illustrated in FIGS. 35-39 which replace the update cursor and macro procedures of FIG. 23 as set forth in FIGS. 26-34. Additionally, the precision button steps 480 and 482 of FIG. 23, the function key steps 484 and 492 of FIG. 23, and the check button procedure 496 of FIGS. 23 and 25 are unnecessary.

In a first step 700, the program determines if an in-flag is set indicating that the serial input interrupt has occurred while the program of FIGS. 35-39 was already in process, and if true, the program executes a return from interrupt to return to the step where the interrupt occurred. If the in-flag is not set then the program in step 702 sets the in-flag to insure that he program will not start over when an interrupt occurs during processing within the program.

Figures 36, 37:
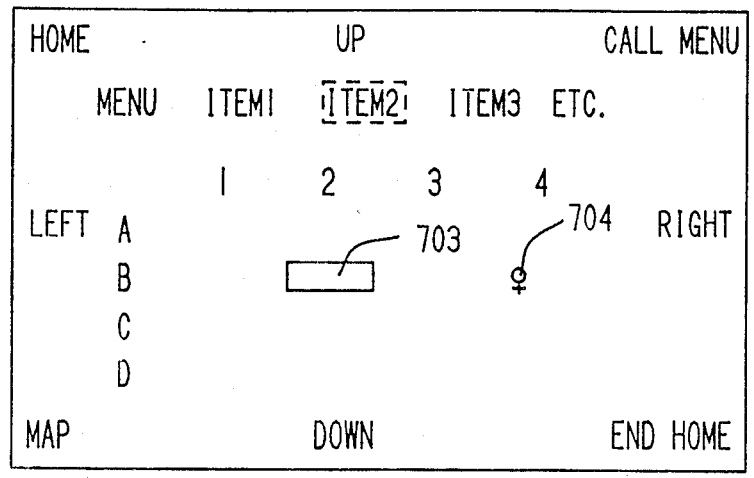
FIG. 36 is an illustration of a display of a computer spread sheet program.
FIG. 37 is a diagram illustrating a pop-up window generated by the procedure of FIG. 35.

A typical spread sheet display is illustrated in FIG. 36 wherein the display includes cells in a rectangular arrangement with rows identified by letters and columns identified by numbers. One of the cells 703 on the screen is normally highlighted indicating that the cell is active. The active cell can be moved by pressing the arrow keys on the keyboard 60. Numerical data, formulas, or textual information can be entered into each cell. Additionally, a special character may be entered to call for a command line or menu such as is illustrated above the rectangular array. This menu can obtain a number of commands, identified item 1, item 2, etc., which have one item highlighted and the highlighting can be moved by the arrow keys to previous or succeeding items. A command can be selected from the menu by pressing the enter key on the keyboard.

A spread sheet may contain many more cells than can be displayed on a single screen. It is noted that the example of FIG. 36 only shows four columns and four rows for simplicity, but that an actual spread sheet program will display many more columns and rows, for example ten columns and 20 rows. The spread sheet can include several thousand columns and several thousand rows. The display may be changed by scrolling. For example, pressing a right arrow key while the control key is pressed will shift the display so that columns 2, 3, 4 and 5 are displayed. Additionally, the display may be changed by paging wherein the arrow key is pressed while the alt key is pressed, for example, pressing the right arrow key with the alt key will result in replacing columns 1, 2, 3 and 4 by columns 5, 6, 7 and 8. Additionally, one command available is a "goto" followed by a cell number such as F10 which will cause the display to be changed so that rows F, G, H and I and columns 10, 11, 12 and 13 are displayed. When a spread sheet does contain hundreds of rows and/or columns, it can be seen that considerable time can be spent changing the display screen in order to find a particular portion of the spread sheet where data is to be entered or formulas are to be changed.

In FIG. 37 there is illustrated a pop-up map which the present program can temporarily substitute for the normal spread sheet grid. This pop-up map contains a rectangular array of page addresses of a spread sheet; any of the row and column addresses can be replaced by a mnemonic so that the user can readily identify various spread sheet areas.

Referring back to FIG. 36, the present driver program superimposes a cursor, such as the symbol ankh 704, on the display screen. This cursor can be positioned within any of the 80 columns and 25 rows of the normal display screen by moving the pointer or finger-grippable element 64 of FIG. 1. When the cursor 74 is in position within one of the cells displayed on the screen and the button 78 is pressed, the active cell 703 is changed to the cell where the cursor 704 is positioned. Edge regions have special functions. For example, the upper left corner is designated as a home region and when the pointer 64 is moved to the upper left corner the cursor 704 is in the upper left corner of the display and pressing the button 78 will result in the spread sheet program changing the display so that the first cell A1 is displayed and active. Similarly, the lower right-hand corner is the end home key and when the button 78 is pressed with the cursor 704 at the display will show the last cell in the spread sheet with this last cell being active. The upper right corner is used to call the menu or command line. When the cursor 704 is in the lower left corner and the switch 64 pressed the pop-up menu of FIG. 37 replaces the displayed rows and columns of the spread sheet. Additionally, the edges between the corners have scrolling functions; i.e., pressing the button 78 when the cursor is positioned on the right edge will cause the columns 1, 2, 3 and 4 to be replaced by columns 2, 3, 4 and 5, or if the alt key is depressed at the same time, the columns 1, 2, 3 and 4 will be replaced by columns 5, 6, 7 and 8. When the map of FIG. 37 is present, the movement of the pointer 78 causes the highlighted address to change in correspondence to the position of the pointer 78 within its rectangular area. Pressing the button 78 causes the spread sheet columns and rows to reappear on the display with the indicated cell from the map being the upper left corner of the columns and rows.

Referring back to FIG. 35 the program from step 702 proceeds to step 710 where it is determined if the display is presently the map of FIG. 37. If true, the program proceeds to step 712 where the position of the highlight 706 is changed to correspond to the position of the pointer 64 within its rectangular area of movement. If step 710 is true, the program will proceed to step 714 where it is determined if the spread sheet program is in the menu mode. If true, the program proceeds to step 716 where the highlight of the menu item will be changed to correspond to the position of the pointer 64 along the X axis, i.e., left or right position. This is performed by comparing the previous menu position with the present pointer X coordinate and if a change is required by transferring an appropriate left or right arrow key code to the keyboard buffer. If step 714 is false, then the program proceeds to step 718 where the previous position of the cursor 704 is compared with the present X and Y coordinates of the pointer 64, and if not in correspondence, then the present cursor 704 is erased and rewritten in the appropriate column and row by utilizing normal video display functions of the operating system of the computer 52.

Figure 38:
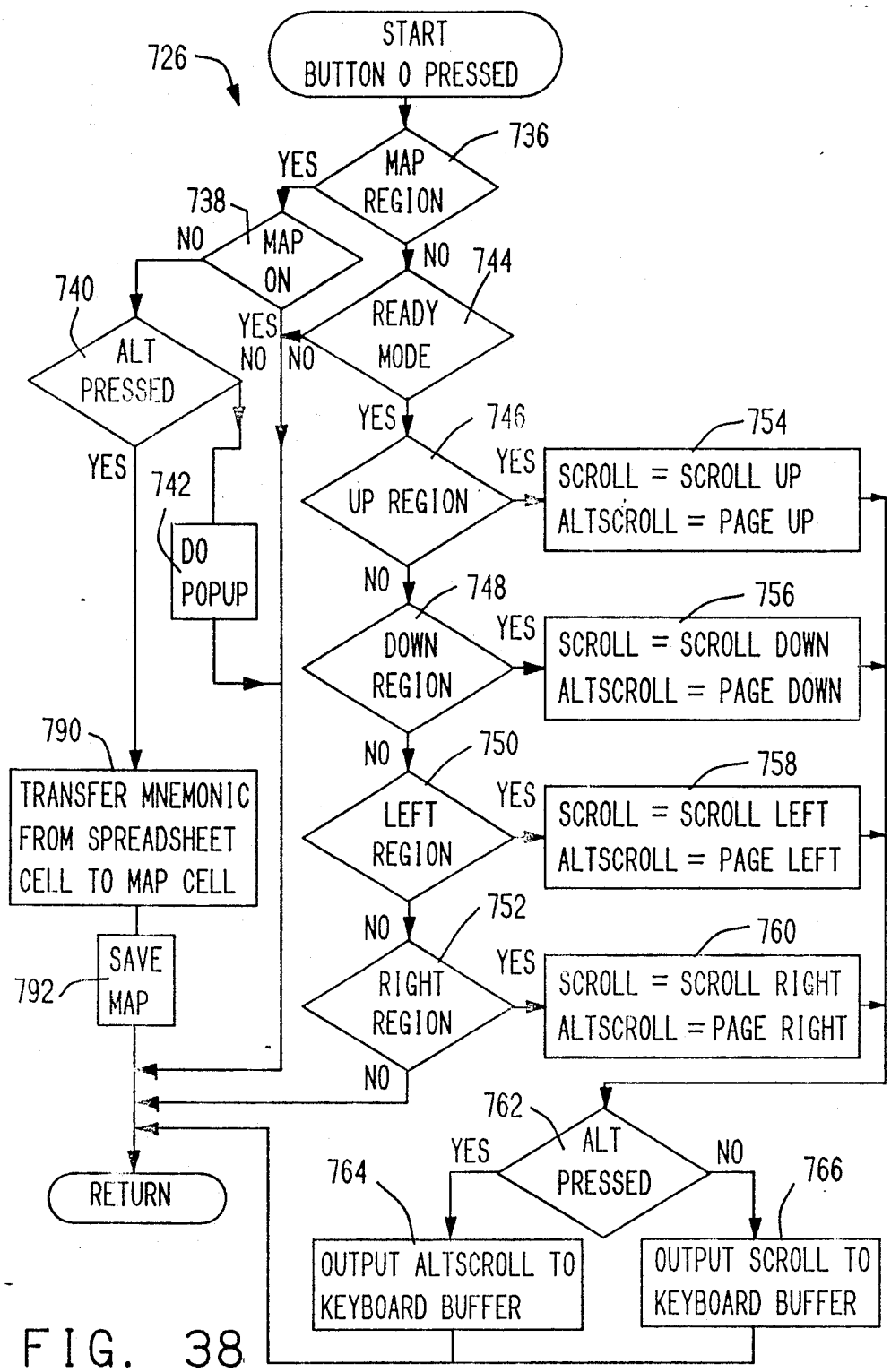
FIG. 38 is a diagram of a button 0 press procedure in the procedure of FIG. 35.

From step 712, 716 or 718, the program proceeds to step 720 where it is determined if a change has been made in the switch input byte. If false, the program proceeds to step 722 where the in-flag is cleared, after which the program executes a return from interrupt to return to the user program at the point where the interrupt occurred. If there is a switch change, the program proceeds to step 724 where in one of the routines 726, 728, 730 or 732 is called. The routine 726, shown in detail in FIG. 38, is called when the button 78 is depressed. In first step 736 it is determined if the present cursor position corresponds to the map edge region, i.e., the lower left corner of the screen, and if true, proceeds to step 738 where it is determined if the display presently displays the map of FIG. 37. If true, the program executes a return since there is no need to redo the pop-up map of FIG. 37. If false, the program proceeds to step 740 where it is determined if the alt key is depressed. If false, the program proceeds to step 742 where the pop-up map of FIG. 37 is written on the display in place of the columns and rows of the spreadsheet. The map is a file which may be created when the procedure of step 742 is first called, or may be a file previously saved on a disk and which was identified during initialization. Initial creation of a file is made by transferring an end home code to the spread sheet program, identifying the last spreadsheet cell to determine the number of rows and columns in the spreadsheet, dividing these numbers by the respective numbers of rows and columns in the map to determine the numbers of rows and columns by which each cell of the map of FIG. 37 differs from its adjoining cells, and then assigning the corresponding addresses to the cells of the map. Following the pop-up procedure 742, the program executes a return.

If step 736 is false, the program proceeds to step 744 where it is determined if the user or spread sheet program is in a ready mode which indicates that the columns and rows are active and the program is not in a menu mode. If true, the program then proceeds through steps 746, 748, 750 and 752 to determine if the cursor 704 is either in a edge region designated as the up region, down region, left region, or right region, respectively. If step 746 is true, the program in step 754 transfers a scroll up code to the scroll variable and a page up code to the alt scroll variable. If step 748 is true, the program branches to step 756 where a key down code is transferred to the scroll variable and a page down code is transferred to the alt scroll variable. If step 750 is true, the program branches to step 758 where a scroll left code is transferred to the scroll variable and a page left code is transferred to the alt scroll variable. If step 752 is true, the program branches to step 760 where a scroll right code is transferred to the scroll variable and a page right code is transferred to the alt scroll variable. From steps 754, 756, 758 and 760 the program proceeds to step 762 where the program will branch to step 764 if the alt key is pressed and to step 766 if the alt key is not pressed. In step 764 the alt scroll variable is transferred to the keyboard buffer and in step 766 the scroll variable is transferred to the keyboard buffer. Following step 764 and 766, or 752 if false, the program returns to the procedure of FIG. 35.

Figure 39:
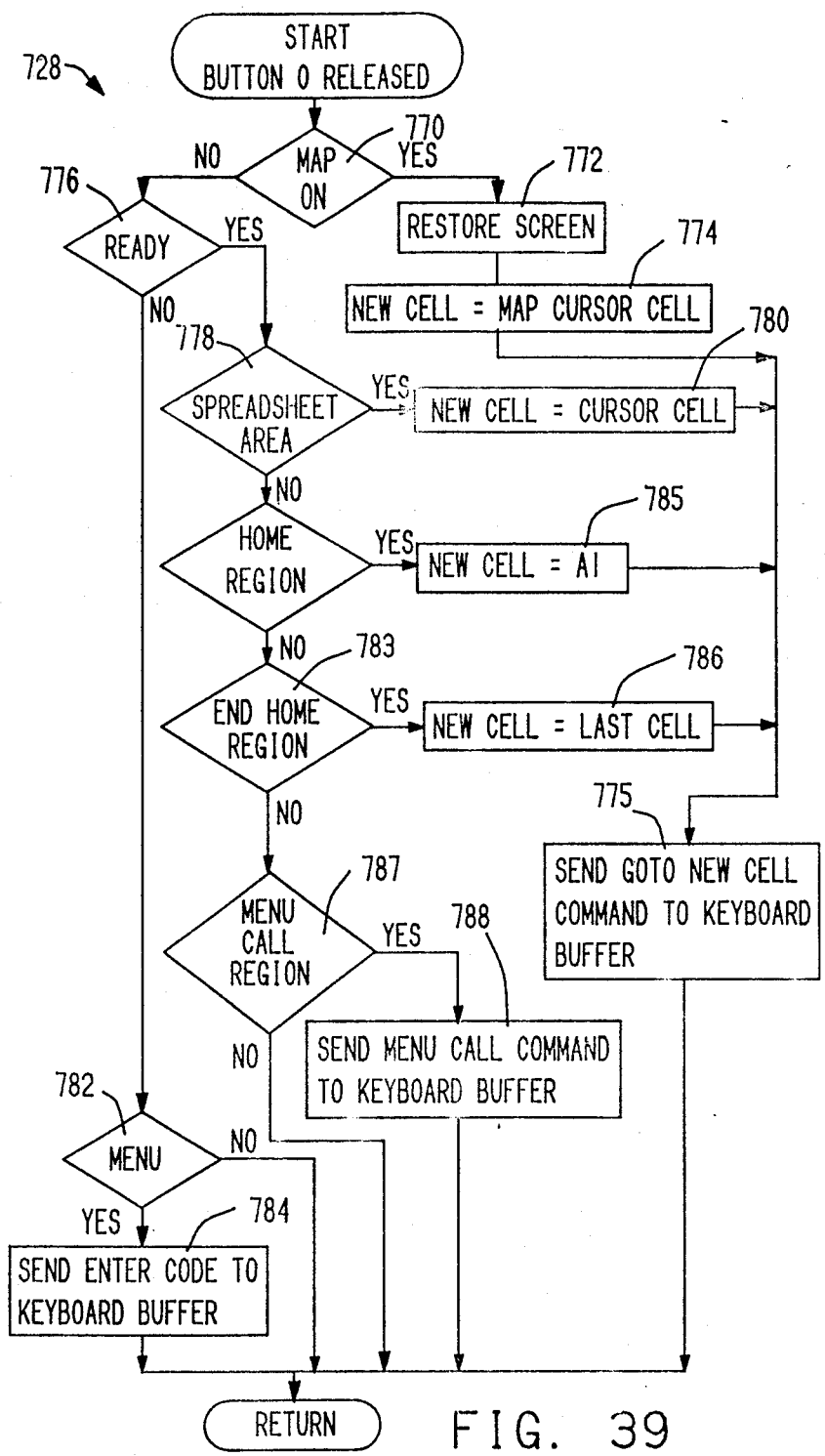
FIG. 39 is a detailed diagram of a button 0 release procedure employed in the procedure of FIG. 35.

The procedure of step 728, illustrated in detail in FIG. 39, is called when the button 78 is released. In step 770 the program branches, if the map is currently being displayed, to step 772 where the display of the spreadsheet cells is restored and then to step 774 where the previously-recorded cell address corresponding to the marker 703 in the map of FIG. 37 is saved as the new cell and sent with a "GOTO" command to the keyboard buffer in step 775. It is noted that the pop-up procedure of FIG. 742 involves a delay so that if button 78 is pressed and then quickly released, the release will occur during the delay of the step 742 and the program in step 700 of FIG. 35 will be true to prevent the quick release of the button 76 from executing procedure 728. The program must then wait for a subsequent pressing and release of the button 78 before steps 772 and 774 can be executed. Alternatively, the button 78 may be depressed and held depressed while the pointer 64 is moved to highlight the desired address in the map of FIG. 37 and then released to call the steps 772 and 774 to display the desired page of the spread sheet.

If the step 770 is false, the program proceeds to step 776 where the program will branch to step 778 if the spread sheet program is in the ready mode. In step 778 it is determined if the position of the cursor 704 is within the cell area of the spreadsheet display, and if true, the program branches to step 780 the cursor cell is saved as the new cell and the program proceeds to step 775 to execute a goto the new cell. A goto command for a cell currently being displayed only results in moving of the active cell or highlight to the cursor cell.

If step 778 is false the program proceeds to step 781, and then to step 783 if step 781 is false. In step 781 the program determines if the cursor 704 is in the home region, and if true makes the new cell equal to cell A1 in step 785. Step 783 branches to step 786 where the new cell is made equal to the last cell when the cursor 704 is in the end home region. From steps 785 and 786 the program goes to step 775 where the goto new cell command is passed to the keyboard buffer. If step 783 is false the program branches to step 787 where the presence of the cursor 704 in the menu cell region causes the program to branch to step 788 where a menu cell command code is sent to the keyboard buffer.

If step 776 is false, the program proceeds to step 782 where the presence of a menu mode results in a branch to step 784 where an enter code is sent to the keyboard buffer to select the corresponding highlighted menu function. From step 775, 788, or 784, or from step 782 or 783 if false, the program returns to the procedure of FIG. 35.

The procedure of FIG. 38 contains steps 790 and 792 whereby a mnemonic can be written in the map file to replace a displayed row and column address. In this procedure the map of FIG. 37 is first called by positioning the cursor in the lower left corner and pressing the button with subsequent release of the button when the highlight area 706 is positioned on the desired map cell to be changed. This causes the spread sheet display to return with this particular cell being active. Then the operator uses the keyboard to enter the desired mnemonic into that spread sheet cell, or alternatively, a mnemonic already within the cell can be employed. Now the operator returns the cursor 704 to the lower left corner and holds the alt key down while pressing button 78. Step 740 of FIG. 38 is now true causing the program to branch to steps 790 and 792 where the mnemonic within the spread sheet cell is written to the map cell and the map is then saved in a disc file or the like so that it may be later recalled by the operator during a subsequent initialization of the driver program.

Figure 40:
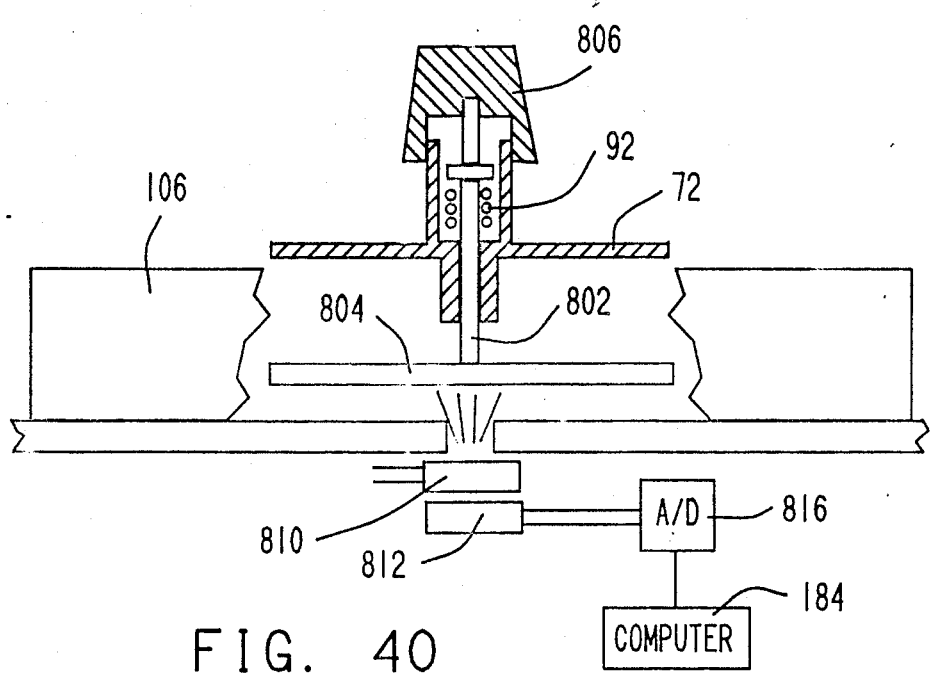
FIG. 40 is a diagram, partial in cross-section illustrating a modification of the pointing device of FIG. 1.
Figure 41:
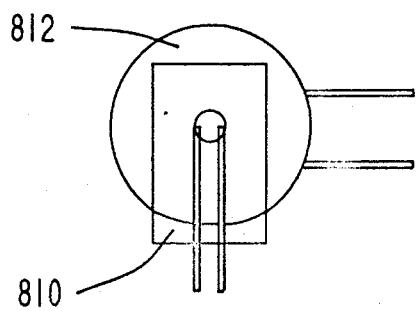
FIG. 41 is a plan view of an LED and photosensor arrangement of FIG. 40.

In FIG. 40 there is illustrated a modification of the pointing device wherein the shaft 90 of FIG. 3 is replaced by a shaft 802 which has a plane mirror or reflector 804 mounted on its bottom end in place of the guillotine of FIG. 3. The mirror 804 may be slightly concave or convex to accommodate slight pivotal movement of the shaft 802. Where the pivot axis is below the mirror 804, the mirror should be concave, and where the pivot axis is above the mirror 804, the mirror should be convex to avoid changing the signal by such pivotal movement of the shaft 802. The top of the pin 802 is to be depressed by the button 78 of FIG. 3 or alternatively, a separate handle 806 is mounted on the upper end for both moving the pointer in the X and Y directions and also for depressing the shaft 802 and mirror 804 in a Z direction. A light emitting-diode 810 and a light sensor such as a phototransistor 812 are mounted below the mirror 804 so that light from the LED 810 is directed toward the mirror and reflected toward the photodetector. For example, as shown in FIG. 41 the emitter 810 is of the type having a normally clear plastic case and may be mounted directly over the detector 812. Since the light emitted by the emitter 810 is divergent, the magnitude of the output of the detector will vary in accordance with the distance of the mirror above the detector 810 and 812. Thus, the magnitude of the detected light can be determined by an analog to digital detector 816 operated by the pointer computer 184 to generate a Z axis coordinate. This Z axis coordinate can then be transmitted to the computer to be utilized for a Z axis position. For example, a paint program may utilize a Z axis information to determine the intensity of a color brush procedure.

Figure 42:
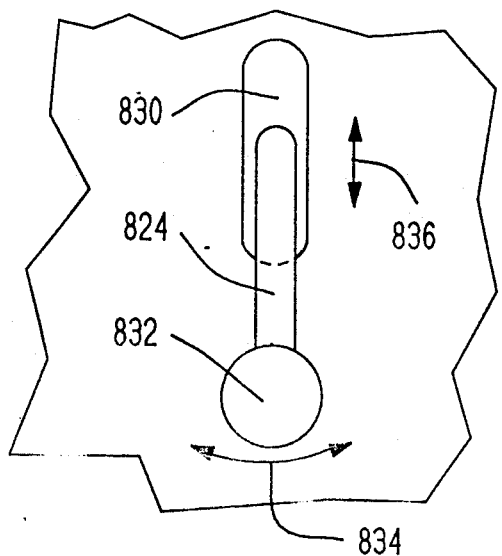
FIG. 42 is a plan view of a modified handle for the pointer of FIG. 3.
Figure 43:
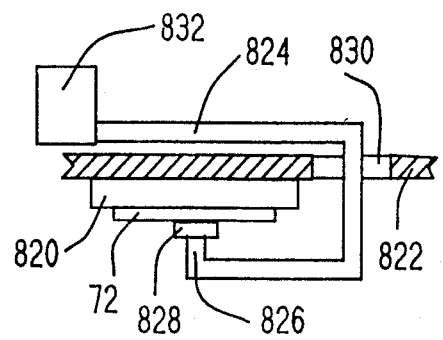
FIG. 43 is a section view, taken from the right side of the handle of FIG. 42.
Figure 44:
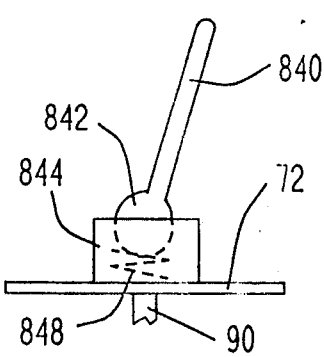
FIG. 44 is an elevational diagram of a further pointer handle modification.

A pointing device 820 with a modified handle structure is illustrated in FIGS. 42 and 43 wherein the pointing device 820 is mounted on the underneath side of a printed circuit board 822. A C-shaped handle 824 has its lower end 826 rotatably connected to the upper portion 828 of the sliding plate cover 72 of the pointing device 820. The C handle extends through a slot 830 in the printed circuit board 822 and has a knob 832 mounted on its upper end so that the pointer device 820 may be operated by pivoting the knob 832 as shown by double headed arrow 834 and by sliding the handle forward and backward as shown by double headed arrow 836. This C handle arrangement enables employment of the pointer device 820 on keyboards and other devices where space may be limited on the upper side of the printed circuit board.

A further modification of the handle structure is illustrated in FIG. 4 wherein a pen-like handle 840 has a ball-like lower end 842 which is retained by a retainer member 844 mounted on the slidable skirt 72 of the pointer device sliding plate 72. The pen-like handle 840 is biased upward in the retainer 844 by a spring 848 so that the handle 840 may be depressed to operate the pin 90 of the pointing device.

Figure 45:
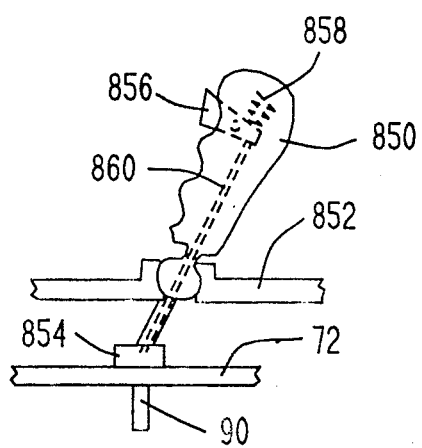
FIG. 45 is an elevational sectional diagram of a still further pointer handle modification.

A still further modified handle structure is illustrated in FIG. 45 wherein a joystick-type handle 850 is pivotally mounted on a top of a case housing 852 in which the pointing device is mounted. The lower end of the handle pivotally engages the upper projecting portion 854 of the slidable plate 72 of the pointing device for moving the pointing device in X and Y directions. Additionally, the joystick 850 contains a button 856 which is normally biased upward by a tension spring 858 so that the button 856 may be depressed to operate a shaft 860 which at its lower end is arranged to operate the pin 90 of the pointer.

Figure 46:
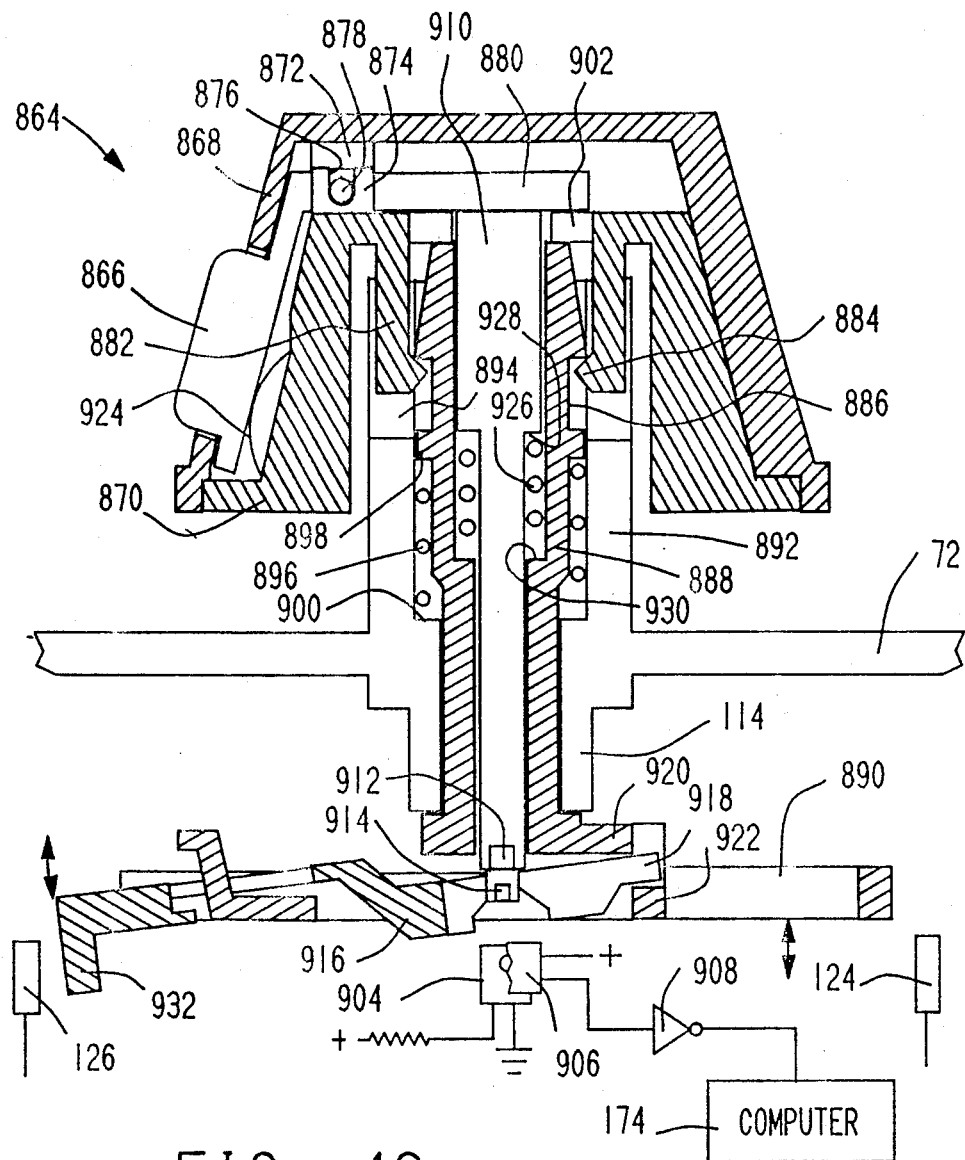
FIG. 46 is a sectional view taken from the front of a broken-away portion of a modified pointer device.

A modified portion of the pointing device structure, shown in FIG. 46, includes provisions for having two button operation, one by depressing a handle portion of a modified finger-grippable element indicated generally at 864, and the second by depressing a button 866 on the handle portion. The handle portion includes an outer knob shell 868 secured on an inner knob member 870. Mating portions 872 and 874 of the respective shell 868 and member 870 form recesses 876 (only one shown) for pivot pin 878 on arm 880 of the button 866. The inner knob member 870 has central downward extending fingers 882 which have inward projections 88u4 engaged in recesses 886 in the outer surface of an upper end of a tubular member 888 which is mounted at its lower end on guillotine member 890. The tubular member 888 extends from the guillotine 890, whcih engages the lower end fo the downward extending hollow stem 114 of the sliding plate or skirt 72, through the lower tubular stem 114 and an upward extending hollow stem 892 of the sliding cover plate or skirt 72. Slots 894 in the upper tubular stem 892 contain the fingers 882 to limit rotative movement of the knob. A compression spring 896 is interposed between a collar 898 on the tubular shaft 888 and a ledge 900 formed in the inside of the hollow stem 892 for biasing the shaft 888 upward so that the guillotine 890 engages the bottom of the step 114. The inner knob member 870 has an upper inward extending lip 902 engaging the upper end of the tubular shaft 888 so that depression of the knob against the bias of the spring 896 causes the shaft 888 and guillotine 890 to a lower position to interrupt a light path between an LED 904 and a light sensor 906. The light sensor is coupled by inverter 908 to an input of the computer 174 of FIG. 9.

A pin 910 slidably extends through the lumen of the tubular shaft 888 and has horizontal projections 912 and 914 engaging upper and lower sides of a member 916 which has one end 918 pivotally engaged between upper and lower cross bars 920 and 922 of the member 890. A spring 924 is interposed between the inner knob portion 870 and the button 866 to bias the button outward and pivot the distal end of the arm 880 against the upper end of the pin 910. A compression spring 926 is interposed between a collar 928 on the pin 910 and a ledge 930 in the tubular shaft 888 to urge the pin 910 upward. The spring 926 is selected to exert substantially greater downward force on the pin 910 than the upward force of the spring 926 to thus normally retain the member 916 pivoted downward where end bar 932 interrupts the light path between the LED 126 and light sensor 124 (see also FIG. 9). When the button 866 is depressed, the distal end of lever 880 pivots upward to permit pin 910 to raise under the urging of spring 926 and to pivot the member 916 upward about end 918 so that end bar 930 is raised above the light path between LED 126 and light sensor 124 to permit the computer 174 of FIG. 9 to sense operation of the button switch.

The finger-grippable element 864 is designed to be gripped between the thumb and forefinger or first two fingers of the hand of an operator with the button engaged by the thumb. The orientation of the knob in FIG. 46 is shown for a right-handed person, but the knob can be removed and reinstalled with a 180° rotation about a vertical axis so that it can be used in the same manner by a left-handed operator.

Since many modifications, variations and changes in detail may be made to the above described embodiments, it is intended that all matter described in the foregoing description and shown in the accompanying drawings be interpreted as illustrative and not in a limiting sense.

What is claimed is:

1. A computer pointing system comprising
   a housing,
   a finger-grippable element mounted in the housing for moving in two dimensions,
   said housing including area edge means for limiting movement of the finger-grippable element to a pointer area of movement,
   computer means including a two-dimensional display on which a marker can be generated and moved within a display area of movement,
   means having two modes for detecting movement of the finger-grippable element and for moving the marker in the display area of movement,
   a first mode of said two modes being such that said marker moving means moves the marker in the display area of movement by a distance which is proportional to a detected distance of movement of the finger-grippable element in the pointer area of movement,
   the second of said two modes being such that said marker moving means moves the marker in the display area of movement by a distance which is equal to a product of a distance of the marker from an edge of the display area of movement times a quotient of a detected distance of movement of the finger-grippable element divided by a distance of the finger-grippable element from an edge of the pointer area of movement, and
   means for selecting operation of the marker means in the first or second mode.

2. A computer pointing system as claimed in claim 1 wherein the selecting means includes means for detecting a rate of movement of the finger-grippable element, means responsive to the detected rate of movement being above a predetermined threshold rate for operating the marker moving means in the second mode, and means responsive to the detected rate of movement being less than the predetermined rate for operating the marker moving means in the first mode.

3. A computer pointing system as claimed in claim 1 wherein the selecting means includes means defining an outer ring area bordered upon and within the pointer area of movement, means for detecting movement of the finger-grippable element within the outer ring area to operate the marker moving means in the second mode, and means for detecting movement of the finger-grippable element within a central area surrounded by the inner border of the outer ring area for operating the marker moving means in the first mode.

4. A computer pointing system as claimed in claim 2 wherein the selecting means includes means defining an outer ring area bordered upon and contained within the edges of the pointer area of movement, means for detecting movement of the finger-grippable element within the outer ring area to operate the marker moving means in the second mode, and means for detecting movement of the finger-grippable element within the inner border of the outer ring area for operating the marker moving means in the first mode.

5. A computer pointing system as claimed in claim 1 including push button means, means responsive to a first state of the push button means for operating the marker moving means in the first mode, and means responsive to a second state of the push button means for operating the marker moving means in the second mode.

6. A computer pointing system as claimed in claim 1 wherein the marker moving means further includes a zoom mode and a full screen mode, said full screen mode being such that said marker moving means moves the marker over the full screen area of movement of the display in the second mode of operation, and said zoom mode being such that said marker moving means moves the marker on the display within a zoom area of movement in the first mode, said zoom area of movement being a portion of the full screen area of movement and being substantially less than the full screen area of movement, and wherein the computer pointing system includes means for selecting operation of the marker moving means in the full screen mode or the zoom mode.

7. A computer pointing system as claimed in claim 6 including means operational during the zoom mode for detecting a rate of movement of the finger-grippable element greater than a predetermined rate, means responsive to the detected rate of movement being greater than a predetermined threshold rate for operating the marker moving means in the second mode, and means responsive to the detected rate of movement being less than the predetermined rate for operating the marker moving means in the first mode.

8. A computer pointing system as claimed in claim 6 including means operated when the marker moving means is in the zoom mode for defining an outer ring bordered upon and within the pointer area of movement, means for detecting movement of the finger-grippable element within the outer ring area to operate the marker moving means in the second mode, and means for detecting movement of the finger-grippable element within a central area surrounded by the inner border of the outer ring area for operating the marker moving means in the first mode.

9. A computer pointing system as claimed in claim 7 including means operated when the marker moving means is in the zoom mode for defining an outer ring bordered upon and within the pointer area of movement, means for detecting movement of the finger-grippable element within the outer ring area to op rate the marker moving means in the second mode, and means for detecting movement of the finger-grippable element within a central area surrounded by the inner border of the outer ring area for operating the marker moving means in the first mode.

10. A computer point system comprising
    computer means including a monitor having a two-dimensional display on which a marker can be generated and moved within a display area of movement,
    finger-grippable means for being gripped by an operator and moved in two dimensions of movement,
    means responsive to movement of the finger-grippable means for generating pairs of quadrature signals having pulses corresponding to increments of movement of the finger-grippable means in the respective two dimensions,
    means responsive to the quadrature signals for detecting a rate of movement of the finger-grippable means above a predetermined rate,
    computer means including a two-dimensional display on which a marker can be generated and moved within a display area of movement, means for moving the marker on the display in correspondence with movement of the finger-grippable means in response to the quadrature signals and to the rate of movement detecting means and having first and second modes of operation which correspond to the rate of movement being below and above, respectively, the predetermined rate, said first mode being such that the marker moving means moves the marker on the display by increments which correspond to the increments of the movement of the finger-grippable means by a first rate, and said second mode being such that the marker moving means moves the marker on the display by increments which correspond to the increments of the movement of the finger-grippable means by a second rate which is different from the first rate.

11. A computer pointing system as claimed in claim 10 wherein the second rate is proportional to a distance of the marker from an edge of the display area of movement.

12. A computer pointing system as claimed in claim 10 including means defining a pointer area of movement within which the finger-grippable means is movable, and wherein the second rate is equal to a product of a distance of the marker from an edge of the display area of movement times a quotient of a detected distance of movement of the finger-grippable means divided by a distance of the finger-grippable means from an edge of the pointer area of movement.

13. A computer pointing system comprising finger-grippable means for being gripped by an operator and moved in two dimensions of movement, means defining a pointer area of movement within which the finger-grippable means is movable, ring means for detecting movement of the finger-grippable means in an outer ring area of movement within the pointer area of movement, control means for detecting movement of the finger-grippable means in a central area of movement defined by the inside border of the ring area of movement, computer means including a two-dimensional display on which a marker can be generated and moved within a display area of movement, means responsive to the ring means and the central means for moving the marker on the display in correspondence with movement of the finger-grippable means, said marker moving means having first and second modes of operation corresponding to movement of the finger-grippable means in the outer ring area of movement and the central area of movement, respectively, said first mode being such that the marker moving means moves the marker on the display by increments which correspond to the increments of the movement of the finger-grippable means by a first rate, and said second mode being such that the marker moving means moves the marker on the display by increments which correspond to the increments of the movement of the finger-grippable means by a second rate which is different from the first rate.

14. A computer pointing system as claimed in claim 13 wherein the second rate is proportional to a distance of the marker from an edge of the display area of movement.

15. A computer pointing system as claimed in claim 10 including means defining a pointer area of movement within which the finger-grippable means is movable, and wherein the second rate is equal to a product of a distance of the marker from an edge of the display area of movement times a quotient of a detected distance of movement of the finger-grippable means divided by a distance of the finger-grippable means from an edge of the pointer area of movement.

16. A computer pointing system comprising a housing, a finger-grippable element mounted in the housing for movement in two dimensions, said housing including edge means for limiting movement of the finger-grippable element to a pointer area of movement, computer means including two-dimensional display on which a marker can be generated and moved within a display area of movement, means for detecting movement of the finger-grippable element within its pointer area of movemetn and for moving the marker in the display area of movement in correspondence with the detected movement of the finger-grippable element in the pointer area of movement, means defining a plurality of pointer edge regions around the periphery of the pointer area of movement, a plurality of stored instructions corresponding to the plurality of pointer edge regions, switch means associated with the finger-grippable element, means responsive to operation of the switch means when the finger-grippable element is positioned within one of the plurality of pointer edge regions for producing a computer operation in correspondence with the corresponding instruction at the pointer edge region where the switch is operated.

17. A computer pointing system as claimed in claim 16 wherein the computer operation producing means includes means for transferring the selected instruction to a keyboard buffer of a computer.

18. A computer pointing system as defined in claim 16 wherein the pointing system is designed for operation with a user program employing a file containing a plurality of pages of information which can only be displayed on the monitor one page at a time, and wherein the computer operation producing means includes means responsive to operation of the switch means at one of the edge regions for displaying on the display an index of pages of the file and for permitting subsequent movement of marker means to individual items of the displayed index, and means responsive to subsequent operation of the switch means for displaying the page corresponding to the index item marked at the time of switch operation.

19. A computer pointing system as claimed in claim 18 wherein the user program is a spread sheet program.

20. A computer multipage file system comprising computer means having a display on which marker means may be generated and moved within an area of display movement, user program means for utilizing a multipage file which contains a plurality of pages of information of which only one page can be displayed on the display at any one time, means in response to an operator generated instruction for displaying on the display an index of listings of the pages of the multipage file and for permitting movement of the marker means to individual items of the index, and means responsive to the operator generating a second instruction when the marker is positioned at a desired listing in the index for displaying the page of information in the multipage file correponding to the desired listing.

21. A computer system as claimed in claim 20 wherein the user program is a spreadsheet program and the listings in the index correspond to cells of respective pages of a spreadsheet file.

22. A computer system as claimed in claim 21 wherein means for displaying includes means for executing an instruction to go to the cell corresponding to the desired listing.

23. A motion sensor comprising
a stationary member formed by molding a transparent plastic material,
a movable member formed by molding a transparent wall for being moved longitudinally in a path,
said stationary member having a transparent wall adjacent and parallel to said movable member wall,
said movable wall member having a grating defined by transverse molded undulations in one surface of the movable member wall,
said stationary member having a pair of gratings defined by transverse molded undulations in one surface of the stationary member wall,
light emitting means for generating a pair of light beams directed transversely through the wall and grating of the movable member and through the wall and respective gratings of the stationary member,
a pair of light sensors disposed on an opposite side of the stationary member and movable member from said light emitting means for detecting light of the respective pair of light beams passing through the walls and gratings,
each of said undulations on the movable and stationary member walls defined by a series of valleys, first incline, hill top and second inclined surfaces wherein the valley and hill top surfaces are parallel to the direction of movement of the movable member, and the first and second side surfaces extend at opposite equal angles selected to reflect and refract substantial portions of the light beams directed transversely to the walls, and wherein each of the valley, first side, hill top and second side surfaces extend equal distances in component directions parallel to the valley and hill top surfaces, and
said pair of gratings on said stationary member being positioned so that one of the gratings is phase shifted relative to the other grating so as to generate quadrature related signals from the pair of light sensors during movement of the movable member.

24. A computer control comprising
a housing
a slide member having a tubular projection extending above the housing and adapted to be moved in two dimensions in a horizontal plane to selected positions,
a pin slidably extending through the tubular member,
spring means biasing the pin upward,
a knob mounted on the upper end of the pin for being engaged and moved by fingers of an operator in three dimension wherein horizontal directions of movement move the slide member, and vertical directions of movement move the pin, a pair of movable members mounted in the housing and coupled to the slide member for movement in respective orthogonal directions in response to corresponding movement of the slide member in the horizontal direction,
each of said pair of movable members including a light control grating for modulating light passing therethrough upon movement of the movable member,
light-emitting means and light responsive means disposed alongside each of the respective light control gratings for responding to light changes due to movement of each respective grating relative thereto wherein each light responsive means generates a pair of signals having opposite quadrature related phases for indicating motion in respective plus and minus directions of movement,
means responsive to the pairs of signals for providing digital data corresponding to the two dimensional position of the knob in the horizontal plane,
a horizontal mirror mounted on the bottom of the pin,
a light emitter mounted on one side of the mirror for producing a diverging vertical beam of light impinging on the mirror,
a light sensor mounted on the one side of the mirror for receiving a limited cross-sectional area of light reflected by the mirror from the beam of light and producing a signal having a magnitude varying in correspondence with the magnitude of the received light, and
analog-to-digital converting means connected to the light sensor for generating digital data corresponding to movement of the knob in a vertical direction.

25. A computer control comprising
a housing,
a slide member having a tubular projection extending above the housing and adapted to be moved in two dimensions in a horizontal plane to selected positions,
a pair of movable members mounted in the housing and coupled to the slide member for movement in respective orthogonal directions in response to corresponding movement of the slide member in the horizontal directions,
each of said pair of movable members including a light control grating for modulating light impinging thereon upon movement of the movable member,
light emitting means and light responsive means disposed alongside each of the respective light control grating for responding to light changes due to movement of each respective grating relative thereto wherein each light responsive means generates a pair of signals having opposite quadrature related phases for indicating motion in respective plus and minus directions of movement,
means responsive to the pairs of signals for providing digital data corresponding to the two dimensional position of the slide member in the horizontal plane,
a tubular shaft slidably extending through the tubular member,
first means biasing the tubular shaft upwards,
a pin slidably extending through the tubular shaft,
second spring means biasing the pin upwards,
a knob mounted on the upper end of one of the tubular shaft and the pin, a button mounted in the knob and including means engaging the upper end of the other of the tubular shaft and the pin, a first light interrupting member coupled to the lower end of the tubular shaft for vertical movement therewith, a second light interrupting member coupled to the lower end of the pin for vertical movement therewith, a first light emitter and a first light detector disposed on corresponding sides of a path of movement of the first light interrupting member, and a second light emitter and a second light detector disposed on corresponding sides of a path of movement of the second light interrupting member.

26. A computer control as claimed in claim 25 wherein one of the first and second light interrupting members is pivotally mounted on the other light interrupting member.

27. A computer control as claimed in claim 25 including button spring means biasing the button to an outward position; and wherein the button is pivotally-mounted on the knob, and has an arm extending from the pivot point into engagement with the upper end of the pin, said button spring means having a spring force sufficient to normally depress the pin to a lower position against the force of the second spring means.

* * * * *